United States Patent
Ikegami et al.

(10) Patent No.: US 8,543,274 B2
(45) Date of Patent: Sep. 24, 2013

(54) POWER OUTPUT APPARATUS

(75) Inventors: Takefumi Ikegami, Wako (JP); Shingo Kato, Wako (JP); Yoshihiro Sunaga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/379,209

(22) PCT Filed: Jun. 18, 2010

(86) PCT No.: PCT/JP2010/060402
§ 371 (c)(1),
(2), (4) Date: Dec. 19, 2011

(87) PCT Pub. No.: WO2010/150713
PCT Pub. Date: Dec. 29, 2010

(65) Prior Publication Data
US 2012/0101677 A1   Apr. 26, 2012

(30) Foreign Application Priority Data

Jun. 25, 2009 (JP) .................. 2009-151669

(51) Int. Cl.
*B60W 20/00* (2006.01)
*B60W 10/06* (2006.01)
*B60W 10/08* (2006.01)

(52) U.S. Cl.
USPC ........ 701/22; 340/439; 340/455; 340/870.05; 340/870.16

(58) Field of Classification Search
USPC .......... 701/22; 340/439, 455, 870.05, 870.16
See application file for complete search history.

(56) References Cited

U.S. PATENT DOCUMENTS

| 2005/0061562 A1* | 3/2005 | Mack ..................... 180/65.2 |
| 2006/0021808 A1* | 2/2006 | McGee et al. ........... 180/65.2 |
| 2007/0205036 A1 | 9/2007 | Ogata et al. |
| 2010/0185349 A1* | 7/2010 | Harada et al. ............ 701/22 |

FOREIGN PATENT DOCUMENTS

| JP | 2005-117779 A | 4/2005 |
| JP | 2005-127411 A | 5/2005 |
| JP | 2006-132448 A | 5/2006 |
| JP | 2007-230383 A | 9/2007 |

(Continued)

OTHER PUBLICATIONS

Russian Office Action dated May 14, 2013, 20 pages.

(Continued)

*Primary Examiner* — Mary Cheung
*Assistant Examiner* — Brian P Sweeney
(74) *Attorney, Agent, or Firm* — Arent Fox LLP

(57) ABSTRACT

At least one of a state and a storage amount of a battery is detected, and a battery output that can be outputted by the battery is calculated on the basis of it. A state of an electric motor is detected, and at least one of electric motor torque and electric motor output that can be outputted from the electric motor and maximal torque of the electric motor are calculated on the basis of it. A state of an engine is detected, and engine starting torque required to start the engine is calculated on the basis of it. An EV range in which the engine is cut off to be capable of driving with only the electric motor is set up on the basis of the calculated battery output, at least one of the calculated electric motor torque and electric motor output, and the calculated engine starting torque.

18 Claims, 14 Drawing Sheets

(56) References Cited

FOREIGN PATENT DOCUMENTS

| | | | |
|---|---|---|---|
| JP | 2008-044521 A | * | 2/2008 |
| JP | 2008-120333 | * | 5/2008 |
| JP | 2009-030680 A | | 2/2009 |
| JP | 2010-083351 A | | 4/2010 |
| JP | 2010-095191 A | | 4/2010 |
| JP | 2010-132241 A | | 6/2010 |

OTHER PUBLICATIONS

Japanese Office Action; Application No. 2011-519865 dated Aug. 6, 2013.

* cited by examiner

POWER OUTPUT APPARATUS

CROSS-REFERENCE TO RELATED APPLICATION

This application is a National Stage entry of International Application No. PCT/JP2010/060402, filed Jun. 18, 2010, which claims priority to JP Patent Application No. 2009-151669, filed Jun. 25, 2009. The disclosures of the prior applications are each hereby incorporated in their entirety by reference herein.

TECHNICAL FIELD

The present invention relates to a power output apparatus for a vehicle provided with an engine and an electric motor, and more specifically, the present invention relates to a power output apparatus capable of starting an engine during driving by only an electric motor if necessary.

BACKGROUND ART

Heretofore, a vehicle that mounts thereon a power train, which uses two kinds of power sources including a gasoline or diesel engine that is an internal combustion and an electric motor (motor generator) in combination, is put to practical use. Such a power train is called as a hybrid system.

A vehicle (hybrid vehicle) on which such a hybrid system is mounted can drive not only with collaboration driving between an engine and an electric motor but also with only the electric motor depending upon performance of an electric motor and a battery. In such a hybrid vehicle, in the case where driving force (torque) required from an electronic control unit exceeds torque that the electric motor can utilize during EV driving in which the vehicle is driven with only the electric motor, the stopping engine is to be restarted.

In order to restart the engine while stopping, it is need to supply engine starting torque depending upon temperature of the engine to the engine. For that reason, the electronic control unit has controlled the electric motor to drive with torque obtained by subtracting this engine starting torque from maximal torque of the electric motor during the EV driving.

Further, a vehicle provided with two motors (electric motor and electric generator) with respect to one engine is also put to practical use. In such a vehicle, it is proposed to correct engine starting torque with temperature (see Japanese Patent Application Publication No. 2005-163551 (hereinafter, referred to as "Patent Literature 1"), for example). In the power output apparatus disclosed in Patent Literature 1, an engine startability state such as temperature of the engine is detected, and it is controlled to start the engine until power required on the basis of this startability state reaches output restriction of the electric motor.

Moreover, in the vehicle provided with one engine and one motor generator, a control apparatus for a hybrid vehicle that a gear ratio is changed until torque required to start an engine is ensured and the engine is thereby started in the case where a request output (calculated by vehicle speed and an accelerator pedal position) from a user exceeds a solo driving possible region of the motor generator during EV solo driving by the motor generator has bee known (see Japanese Patent Application Publication No. 2000-177412 (hereinafter, referred to as "Patent Literature 2"), for example).

SUMMARY OF THE INVENTION

Problems to be Solved by the Invention

However, in the power output apparatus disclosed in Patent Literature 1, engine starting torque is corrected in accordance with temperature of the engine, but this EV range is not corrected on the basis of temperature of the engine or the like in order to enlarge an EV range (EV driving range) for driving with only the electric motor. For that reason, there has been a problem that the EV range for driving with only the electric motor is narrowed too much and an EV driving possible region is thereby restricted substantially.

Further, in the control apparatus for the hybrid vehicle disclosed in Patent Literature 2, it is not controlled so as not to utilize engine starting torque in advance, but it is controlled so that, in the case where it exceeds a solo driving possible region of a motor generator when a request output from a user is calculated, a gear ratio capable of starting the engine is changed to start the engine and the request output is then outputted with the engine and the motor generator. In such a case, there has been a problem that the user feels considerable delay in response to pressing of an accelerator pedal, and a ride quality (ride taste) of the hybrid vehicle is deteriorated.

The present invention is made in view of the above points, and it is an object of the present invention to provide a power output apparatus that can inhibit an output of an electric motor from being overrestricted by calculating the engine starting torque for restarting the engine when the vehicle is driven with only the electric motor more accurately.

Means for Solving the Problem

In order to solve the problems described above, according to one embodiment of the present invention, there is provided a power output apparatus (10) for a vehicle (1), the vehicle (1) including an engine (2), an electric motor (3), an electric motor control section (20) for controlling the electric motor (3), a battery (30), a cutting and connecting section (8) for cutting off and connecting the engine (2) from and to the electric motor (3), and a transmission (4), the power output apparatus (10) being arranged so that the engine (2) can be started by means of the electric motor (3), the power output apparatus (10) including: a battery state detecting section (11) for detecting at least one of a state and a storage amount (SOC) of the battery (30); a battery output calculating section (16) for calculating a battery output that can be outputted by the battery (30) on the basis of at least one of the state and the storage amount (SOC) of the battery (30) detected by the battery state detecting section (11); an electric motor state detecting section (12) for detecting a state of the electric motor (3); an electric motor torque/output calculating section (14) for calculating at least one of electric motor torque and an electric motor output that can be outputted from the electric motor (3) and maximal torque of the electric motor (3) on the basis of the state of the electric motor (3) detected by the electric motor state detecting section (12); an engine state detecting section (13) for detecting a state of the engine (2); a starting torque calculating section (15) for calculating engine starting torque required to start the engine (2) on the basis of the state of the engine (2) detected by the engine state detecting section (13); and an EV range setting section (17) for setting up an EV range on the basis of the battery output that can be outputted by the battery (30), at least one of the electric motor torque and the electric motor output that can be outputted from the electric motor (3), and the engine starting torque required to start the engine (2), the battery output being calculated by the battery output calculating section (16), the electric motor torque and the electric motor output being calculated by the electric motor torque/output calculating section (14), the engine starting torque being calculated by the starting torque calculating section (15), the engine (2) being cut off from the electric motor (3) and the vehicle being able to be driven with only the electric motor in the EV range, wherein the EV range setting section (17) compares the battery output of the battery (30) with the electric motor torque or electric motor output of the electric motor (3) to select any lower one therefrom, and sets up, as the EV range, a range obtained by adding a range in which the engine starting torque is subtracted from the selected torque or output into a range in which the engine starting torque is subtracted from the electric motor maximal torque.

By configuring it in this manner, in the case where an output more than the output of the EV range for the electric motor is required during EV (electric vehicle) driving, that is, when the vehicle is driven with only the electric motor, it is possible to shift to collaboration driving in which driving forces of the engine and the electric motor are outputted to drive wheels by causing the engine to start by means of the engine starting torque left in advance. In a conventional manner, an output of the electric motor has been restricted by torque required to start (push starting) the engine, but the torque has been restricted uniformly without regard for the states of the engine, the electric motor and the battery. For that reason, the EV range may be restricted too much even though the EV driving is possible. However, in the power output apparatus according to the present invention, since the EV range is set up taking the states of the engine, the electric motor and the battery into consideration, it is possible to set up the EV range more precisely. Further, it is possible to start the engine quickly without changing gear ratios and the like in order to ensure torque required to start the engine (engine starting torque) when an output more than the output of the EV range for the electric motor is further required. Therefore, it is possible to ensure the EV range to the maximum while ensuring merchantability at start of the engine.

Further, according to one embodiment of the present invention, there is a provided a power output apparatus power output apparatus for a vehicle (1), the vehicle (1) including an engine (2), an electric motor (3), an electric motor control section (20) for controlling the electric motor (3), a battery (30), a cutting and connecting section (8) for cutting off and connecting the engine (2) from and to the electric motor (3), and a transmission (4), the power output apparatus being arranged so that the engine (2) can be started by means of the electric motor (3), the power output apparatus (10) including: a battery state detecting section (11) for detecting at least one of a state and a storage amount (SOC) of the battery (30); a battery output calculating section (16) for calculating a battery output that can be outputted by the battery (30) on the basis of at least one of the state and the storage amount (SOC) of the battery (30) detected by the battery state detecting section (11); an electric motor state detecting section (12) for detecting at least torque and the number of revolutions of the electric motor (3); an electric motor torque/output calculating section (14) for calculating an output that can be outputted from the electric motor (3) and maximal torque of the electric motor (3) on the basis of the torque and the number of revolutions of the electric motor (3) detected by the electric motor state detecting section (12); an engine state detecting section (13) for detecting a state of the engine (2); a starting torque calculating section (15) for calculating engine starting torque required to start the engine (2) on the basis of the state of the engine (2) detected by the engine state detecting section (13); and an EV range setting section (17) for setting up an EV range on the basis of the battery output that can be outputted by the battery (30), the electric motor torque that can be outputted from the electric motor (3), and the engine starting torque required to start the engine (2), the battery output being calculated by the battery output calculating section (16), the electric motor torque being calculated by the electric motor torque/output calculating section (14), the engine starting torque being calculated by the starting torque calculating section (15), the engine (2) being cut off from the electric motor (3) and the vehicle being able to drive with only the electric motor in the EV range.

The EV range setting section (17) compares the battery output of the battery (30) with the electric motor output of the electric motor (3) to select any lower one therefrom, and sets up, as the EV range, a range obtained by adding a range in which the engine starting torque is subtracted from the selected output into a range in which the engine starting torque is subtracted from the electric motor maximal torque. Even in such a configuration, since the EV range is set up taking the states of the engine, the electric motor and the battery into consideration, it is possible to set up the EV range more precisely. This makes it possible to ensure the EV range to the maximum while ensuring merchantability at start of the engine. Further, since the electric motor output can be calculated from the number of revolutions and the torque of the electric motor, it is possible to reduce a size of the whole detecting apparatus and the number of sensors.

In the power output apparatus according to the present invention, the power output apparatus may further include a vehicle speed detecting section (107) for detecting vehicle speed (Nv) of the vehicle (1), wherein the starting torque calculating section (15) newly may calculate, as the engine starting torque, a value obtained by subtracting a lower limit from the calculated engine starting torque in accordance with the vehicle speed (Nv) detected by the vehicle speed detecting section (107). Since the electric motor rotates at high speed depending upon the vehicle speed of the vehicle, inertial force is applied to the engine. Thus, it is possible to inhibit restriction of the electric motor output using that rate as the engine starting torque.

In the power output apparatus according to the present invention, the battery state detecting section (11) may detect, in addition to the storage amount (SOC) of the battery (30), any of voltage (V), an electric current (I), an electric current integrated value (It), temperature (Tb), a battery inner pressure and battery internal concentration of the battery (30). By the state of the battery in detail in this manner, it is possible to narrow the output restricting range of the electric motor at the EV driving as much as possible.

In the power output apparatus according to the present invention, the electric motor state detecting section (12) may be configured so as to directly detect electric motor temperature (Tm) by means of an electric motor temperature sensor (103) for detecting temperature (Tm) of the electric motor (3), or to detect a conducted electric current, torque and the number of revolutions (Nm) of the electric motor (3) to estimate the electric motor temperature from these detected value. By detecting the state of the battery in detail in this manner, it is possible to narrow the output restricting range of the electric motor at the EV driving as much as possible.

In the power output apparatus according to the present invention, the engine state detecting section (13) may detect any one of the water temperature (Tw) of cooling water for the engine (2) and the oil temperature (To) of lubricating oil for the engine (2), and a position of a piston of the engine (2). By detecting the state of the battery in detail in this manner, it is possible to narrow the output restricting range of the electric motor at the EV driving as much as possible.

Further, in order to solve the problems described above, according to another embodiment of the present invention, there is provided a power output apparatus for a vehicle (1), the vehicle (1) including an engine (2), an electric motor (3), an electric motor control section (20) for controlling the electric motor (3), a battery (30), a cutting and connecting section (8) for cutting off and connecting the engine (2) from and to the electric motor (3), and a transmission (4), the power output apparatus being arranged so that the engine (2) can be started by means of the electric motor (3), the power output apparatus (10) including: a remaining capacity detecting section (23) for detecting a remaining capacity of the battery (30); a battery temperature detecting section (22) for detecting temperature (Tb) of the battery (30); a battery output calculating section (16) for calculating a battery output that can be outputted by the battery (30) on the basis of the remaining capacity of the battery (30) detected by the remaining capacity detecting section (23) and the temperature (Tb) of the battery (30) detected by the battery temperature detecting section (22); an electric motor state detecting section (12) for detecting a state of the electric motor (3); an electric motor torque calculating section (14) for calculating electric motor maximal torque that can be outputted from the electric motor (3) on the basis of the state of the electric motor (3) detected by the electric motor state detecting section (12); an engine temperature detecting section (19) for detecting temperature (Tw, To) of the engine (2); a starting torque calculating section (15) for calculating engine starting torque required to start the engine (2) on the basis of the temperature (Tw, To) of the engine (2) detected by the engine temperature detecting section (19); and an EV range setting section (17) for setting up an EV range on the basis of the battery output that can be outputted by the battery (30), the electric motor maximal torque that can be outputted from the electric motor (3), and the engine starting torque required to start the engine (2), the battery output being calculated by the battery output calculating section (16), the electric motor torque and the electric motor output being calculated by the electric motor torque calculating section (14), the engine starting torque being calculated by the starting torque calculating section (15), the engine (2) being cut off from the electric motor (3) and the vehicle being able to drive with only the electric motor in the EV range, wherein the EV range setting section (17) calculates an electric motor output range from the battery output of the battery (30), the engine starting torque and the electric motor maximal torque of the electric motor (3), and sets up, as the EV range, a range in which the calculated electric motor output range is set to maximal torque. By configuring it in this manner, unlike the case described above, the EV range is set up without regard for the electric motor torque or electric motor output of the electric motor. However, it is possible to set up a sufficiently wide EV range although some connection shock may occur when the engine is connected to the electric motor.

According to another embodiment of the present invention, there is provided a power output apparatus for a vehicle (1), the vehicle (1) including an engine (2), an electric motor (3), an electric motor control section (20) for controlling the electric motor (3), a battery (30), a cutting and connecting section (8) for cutting off and connecting the engine (2) from and to the electric motor (3), and a transmission (4), the power output apparatus being arranged so that the engine (2) can be started by means of the electric motor (3), the power output apparatus (10) including: a remaining capacity detecting section (23) for detecting a remaining capacity of the battery (30); a battery temperature detecting section (22) for detecting temperature (Tb) of the battery (30).

The power output apparatus further comprises a battery output calculating section (16) for calculating a battery output that can be outputted by the battery (30) on the basis of the remaining capacity of the battery (30) detected by the remaining capacity detecting section (23) and the temperature (Tb) of the battery (30) detected by the battery temperature detecting section (22); an electric motor temperature detecting section (24) for detecting temperature (Tm) of the electric motor (3).

The power output apparatus further comprises an electric motor torque calculating section (21) for calculating electric motor maximal torque that can actually be outputted in response to a torque command value outputted from the electric motor control section (20) on the basis of the temperature (Tm) of the electric motor (3) detected by the electric motor temperature detecting section (24); an engine temperature detecting section (19) for detecting temperature (Tw, To) of the engine (2); a starting torque calculating section (15) for calculating engine starting torque required to start the engine (2) on the basis of the temperature (Tw, To) of the engine (2) detected by the engine temperature detecting section (19).

The power output apparatus further comprises an EV range setting section (17) for setting up an EV range on the basis of the battery output that can be outputted by the battery (30), the electric motor maximal torque that can be outputted from the electric motor (3), and the engine starting torque required to start the engine (2), the battery output being calculated by the battery output calculating section (16), the electric motor torque and the electric motor output being calculated by the electric motor torque calculating section (21), the engine starting torque being calculated by the starting torque calculating section (15), the engine (2) being cut off from the electric motor (3) and the vehicle being able to drive with only the electric motor in the EV range.

The electric motor torque calculating section (21) calculates the electric motor torque corrected for temperature (Tm) of the electric motor (3) on the basis of the temperature (Tm) of the electric motor (3) detected by the electric motor temperature detecting section (24), and the EV range setting section (17) sets up, as the EV range, a range in which the electric motor torque is set to maximal torque so as to fit in a predetermined range from the battery output.

In the power output apparatus according to the present invention, in any one of the configurations described above, the engine state detecting section (13) or the engine temperature detecting section (19) may detect temperature (Tw, To) of the engine (2) when the engine (2) is cut off from the electric motor (3), and the EV range setting section (17) may set up the EV range on the basis of the temperature (Tw, To) of the engine (2) when to cut off. The temperature of the engine drops when the engine is cut off. However, it is possible to estimate temperature of the engine when the engine is again connected to the electric motor on the basis of the temperature of the engine at separation, elapsed time and the like.

In the power output apparatus according to the present invention, the power output apparatus may be configured so as to further include a cutting and connecting control section (18) for controlling the cutting and connecting section (8) to cut off the engine (2) from the electric motor (3) or connect the electric motor (3) to the engine (2) in accordance with a driving state of the vehicle (1), wherein, in the case where it is determined that it is difficult to restart the engine (2) in a state that the engine (2) is cut off from the electric motor (3) on the basis of a remaining capacity of the battery (30), the cutting and connecting control section (18) causes the cutting and connecting section (8) not to cut off the engine (2).

In the power output apparatus according to the present invention, in the case where the electric motor (3) is arranged so as to be adjacent to the engine (2), the electric motor state detecting section (12) or the electric motor temperature detecting section (24) may utilize, as the temperature (Tm) of the electric motor (3), oil temperature (To) of lubricating oil detected by the engine state detecting section (13) or the water temperature (Tw) of the cooling water detected by the engine temperature detecting section (19). This makes it possible to cut down a size of the whole detecting apparatus and the number of sensors.

In the power output apparatus according to the present invention, the power output apparatus may further include a cutting and connecting control section (18) for controlling the cutting and connecting section (8) to cut off the engine (2) from the electric motor (3) in accordance with a driving state of the vehicle (1), wherein, in the case where driving force required of the electric motor (3) exceeds the EV range while the vehicle (1) is driven with only the electric motor (3), the cutting and connecting control section (18) causes the cutting and connecting section (8) to connect the electric motor (3) to the engine (2), the cutting and connecting section (8) cuts off this connection after push starting of the engine (2) by ensuring the engine starting torque required for start of the engine (2) from the electric motor (3), and the cutting and connecting section (8) then connects the electric motor (3) to the engine (2) again at the time when the number of revolutions of the engine (2) becomes equivalent to the number of revolutions of an input shaft of the electric motor (3) at EV driving. This makes it possible to supply the electric motor output to the drive wheels to the maximum during the EV driving while inhibiting shock at start of the engine from being transmitted to the drive wheels. Therefore, since the shock to the drive wheels due to connection between the electric motor and the engine in a state that rotation of the engine is unstable can be inhibited, there is no harmful influence on drivability of a driver.

In the power output apparatus according to the present invention, the EV range setting section (17) may increase the EV range by the engine starting torque when the electric motor (3) is cut off from the engine (2) after the cutting and connecting section (8) connects the engine (2) to the electric motor (3) in order to start the engine (2). In this case, since the engine has already started, it is possible to utilize electric motor torque corresponding to the engine starting torque restricted at stop of the engine for the EV driving.

In the power output apparatus according to the present invention, the vehicle (1) may further include a navigation system (40) for navigating driving of a driver of the vehicle (1), wherein the EV range setting section (17) determines whether regeneration from the electric motor (3) may be carried out in the feature or not on the basis of a navigation state in the navigation system (40), and wherein the EV range setting section causes the EV range to be increased in the case where it is determined that regeneration from the electric motor (3) may be carried out in the feature. In the case where it is seen to reach a long downward slope, for example, in the feature by means of the navigation system in this manner, the battery can be charged by regeneration brake of the electric motor at this downward slope. For this reason, there is no problem for the EV driving even though the EV driving range is enlarged.

In the power output apparatus according to the present invention, after driving force required of the electric motor (3) exceeds the EV range to shift from EV driving to collaboration driving between the engine (2) and the electric motor (3), the EV range setting section (17) may move a boundary of the EV range in such a direction not to shift from the collaboration driving to the EV driving for a certain period of time. Further, after shifting from collaboration driving between the engine (2) and the electric motor (3) to EV driving, the EV range setting section (17) may move a boundary of the EV range in such a direction that shift from the EV driving to the collaboration driving is not carried out so that the EV driving can be maintained for a certain period of time. By configuring it in this manner, it is possible to prevent hunting to frequently switch between the EV driving and the collaboration driving from occurring. Therefore, there is no harmful influence on drivability of the driver of the vehicle.

In the power output apparatus according to the present invention, the vehicle (1) may be a plug-in hybrid vehicle having the battery (30) capable of being charged from an external power supply, and the EV range setting section (17) may set up the EV range set up as described above so as to be enlarged in accordance with a capacity of the battery (30). This makes it possible to enlarge the EV driving possible region on the basis of the amount of battery capacity in the case where the battery capacity is enough large even when output restriction of the electric motor is carried out in accordance with a state of the battery, for example. This makes it possible to retard timing of starting the engine, and it is possible to contribute improvement of gasoline mileage (fuel economy) of the vehicle.

Here, in the power output apparatus according to the present invention, the transmission (4) has a plurality of gears each having a predetermined gear ratio (gear ratio). In the case of the plug-in hybrid vehicle as described above, the EV range setting section (17) may set up a region to enlarge the EV range on the basis of vehicle body weight of the vehicle (1), a radius of a drive wheel of the vehicle (1), the respective gear ratios of the plurality of gears, and a shift shock amount (drivability permissible amount: threshold value determined or recognized that the driver of the vehicle feels comfortable) permitted at shift of gears. Normally, the lower the gear is, the larger the gear ratio becomes. Variation at shift change (behavior of the vehicle) is amplified hardly as the gear ratio is larger. Therefore, it is possible to make the EV driving possible region to be enlarged larger as the gear becomes higher. This makes it possible to contribute to improvement of fuel economy of the vehicle further.

In this regard, reference numerals in parenthesis described above exemplify, for reference, corresponding components of embodiments (will be described later).

Advantageous Effects of the Invention

According to the present invention, it is possible to provide a power output apparatus that can inhibit an output of an electric motor from being overrestricted by calculating engine starting torque for restarting an engine when a vehicle is driven with only an electric motor more accurately.

DETAILED DESCRIPTION OF THE INVENTION

Hereinafter, preferred embodiments of a power output apparatus according to the present invention will be described in detail with reference to the appending drawings. A power output apparatus according to the present invention is applied to a vehicle on which an electric motor for driving the vehicle, such as an electric vehicle, a hybrid car or the like, and a high voltage battery are mounted, for example, and is realized by an electronic control unit (ECU: Electronic Control Unit), mounted on the vehicle, for controlling the whole vehicle. In the embodiments described below, the electronic control unit will be described as one that controls an engine, and also controls a transmission, a battery and an electric motor.

First Embodiment

Figure 1:
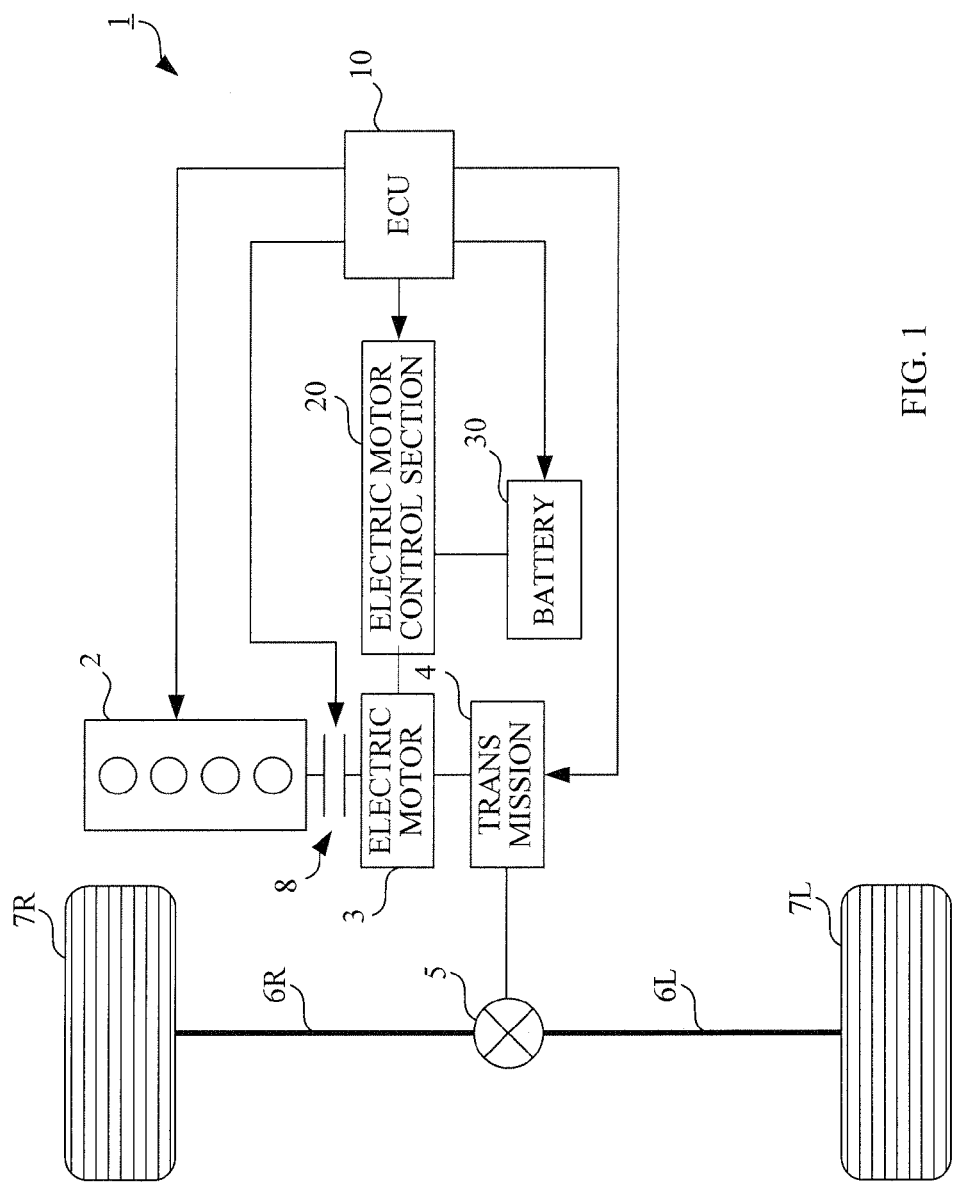
FIG. 1 is a schematic connection configuration drawing of a vehicle according to one embodiment of the present invention.

A configuration of a vehicle according to a first embodiment will first be described. FIG. 1 is a schematic connection configuration drawing of a vehicle according to one embodiment of the present invention. A vehicle 1 according to the present embodiment is a so-called hybrid vehicle, and, as shown in FIG. 1, includes: an engine 2; an electric motor 3; an electric motor control section 20 for controlling the electric motor 3; a battery 30; a cutting and connecting section (clutch) 8 that cuts off and connects the engine 2 from and to the electric motor 3; a transmission 4; a differential mechanism 5; right and left drive shafts 6R, 6L; and right and left drive wheels 7R, 7L. rotary driving force of the engine 2 and the electric motor 3 is transmitted to the right and left drive wheels 7R, 7L via the transmission 4, the differential mechanism 5 and the drive shafts 6R, 6L.

Further, this vehicle 1 includes an electronic control unit (ECU) 10 for controlling the engine 2, the electric motor 3, the transmission 4, the differential mechanism 5, the cutting and connecting section 8, the electric motor control section 20 and the battery 30. The power output apparatus according to the present invention is mainly configured by the electronic control unit 10. The electronic control unit 10 allows the stopping engine 2 to start using rotary drive of the electric motor 3 by connecting the engine 2 to the electric motor 3 via the cutting and connecting section 8 under predetermined conditions, as will be described later. The electric motor control section 20 outputs a torque command value to the electric motor 3 by control of the electronic control unit 10.

Further, the electric motor control section 20 includes an inverter for converting DC power from the battery 30 to AC power (not shown in the drawings).

In this regard, the electronic control unit 10 may be configured as one unit, for example, or may be configured by a plurality of ECUs such as an engine ECU for controlling the engine 2, an electric motor ECU for controlling the electric motor 3 and the electric motor control section 20, a battery ECU for controlling the battery 30, and an AT ECU for controlling the transmission 4 in the case where the transmission 4 is an automatic transmission.

The electric motor 3 functions as a motor that generates driving force to drive the vehicle 1 using electrical energy of the battery 30 at collaboration driving between the engine 2 and the electric motor 3 or EV driving with only the electric motor 3, and functions as a generator that generates electric power by means of regeneration of the electric motor 3 at deceleration of the vehicle 1. At this regeneration of the electric motor 3, the battery 30 is charged by electric power (regeneration energy) generated by the electric motor 3.

In this regard, in the present embodiment, each of the engine 2, the electric motor 3 and the like may have a known configuration. Since they are not a feature (characterizing portion) of the present invention, detailed explanations thereof are omitted.

Figure 2:
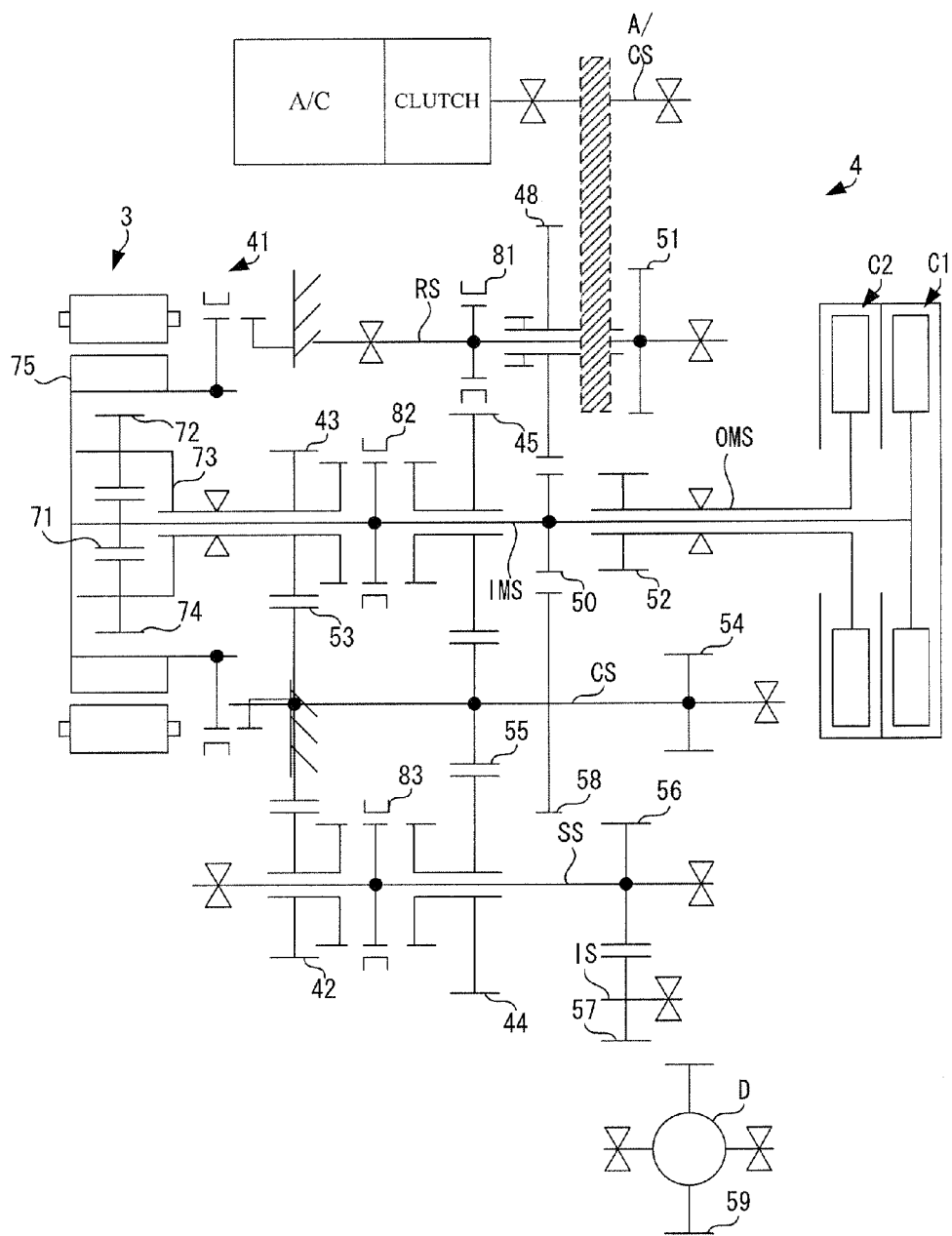
FIG. 2 is a skeleton diagram showing one example of a transmission shown in FIG. 1.
Figure 3:
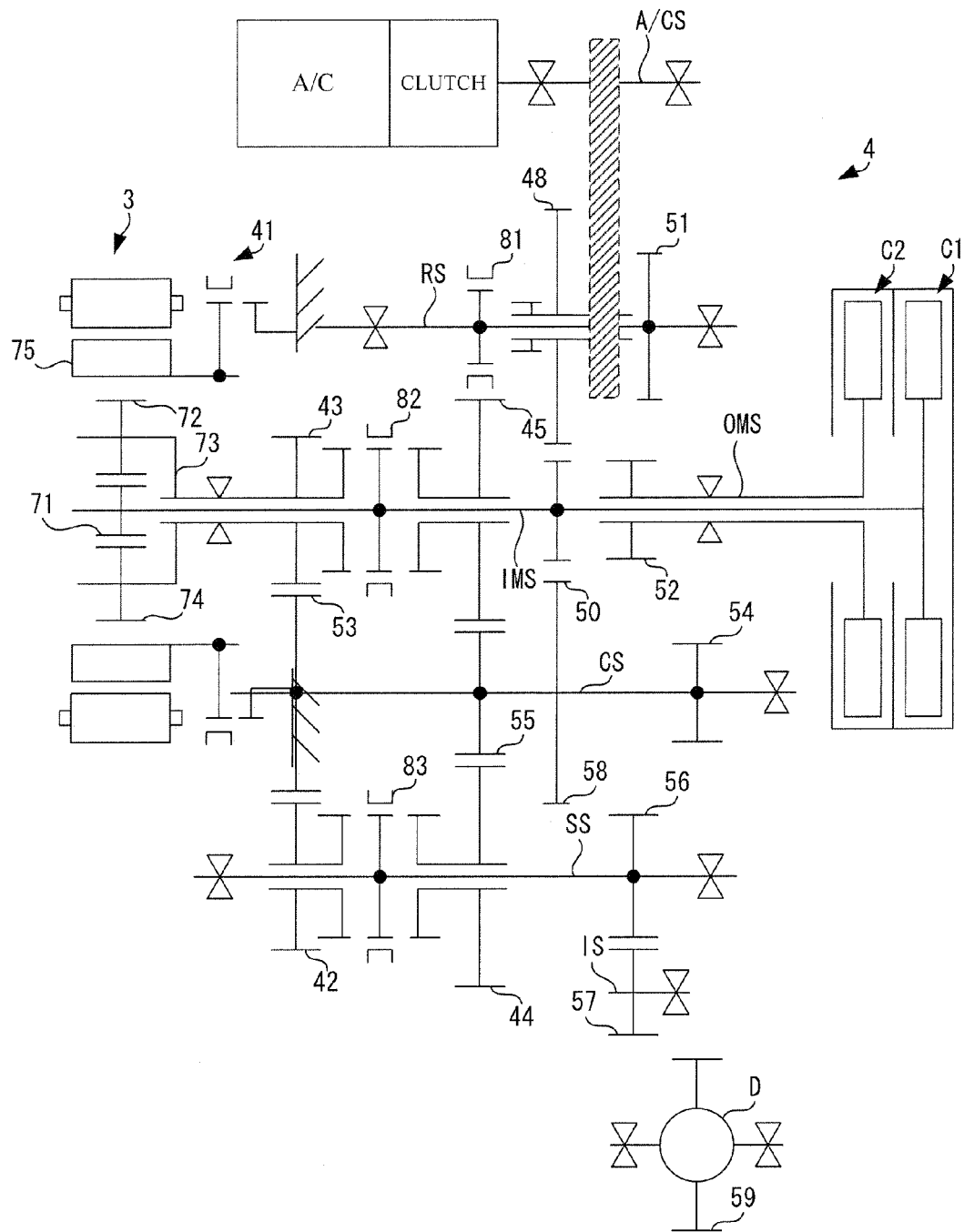
FIG. 3 is a skeleton diagram showing another example of the transmission.
Figure 4:
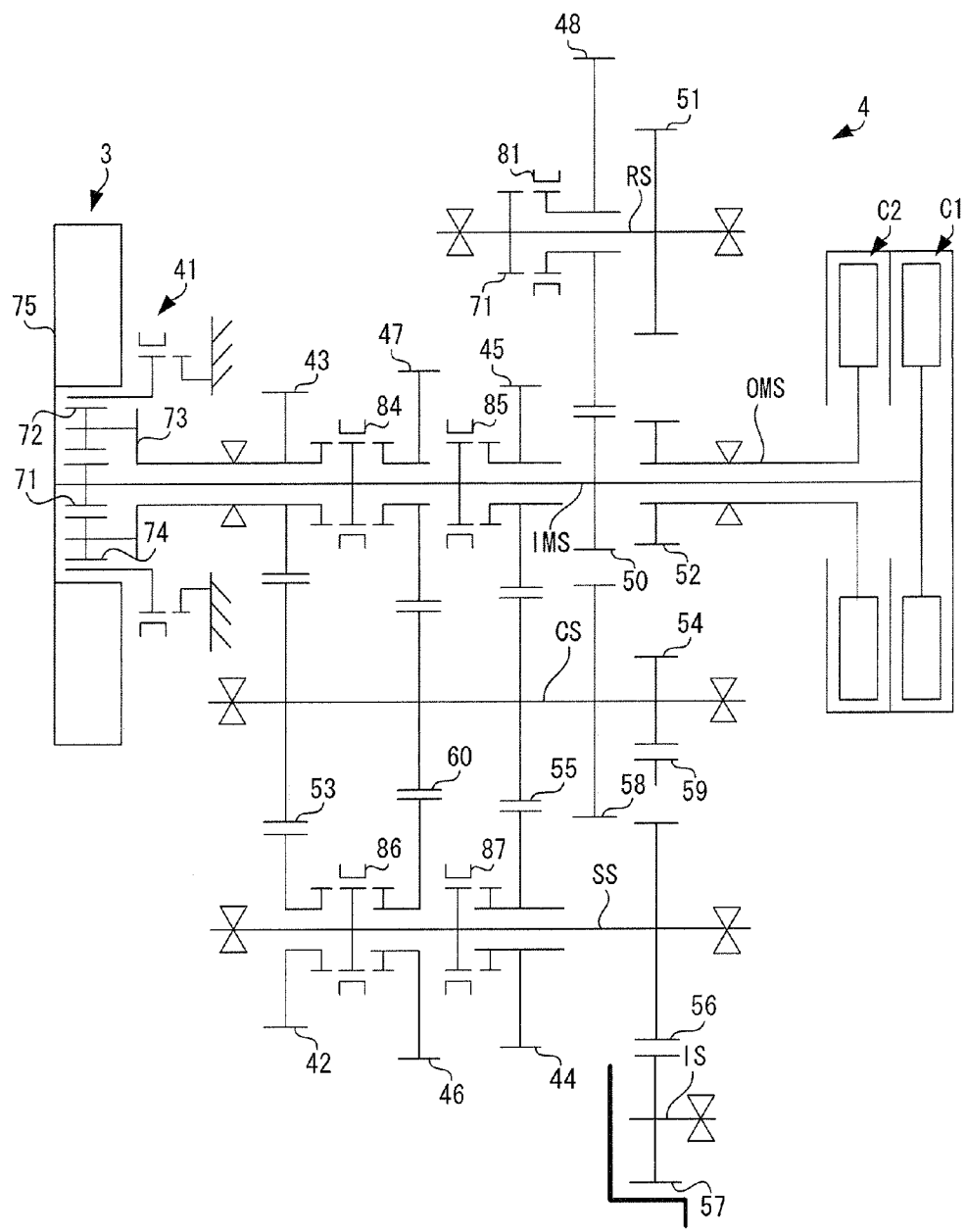
FIG. 4 is a skeleton diagram showing still another example of the transmission.

Next, a configuration of the transmission 4 according to the present embodiment will be described. FIG. 2 is a skeleton diagram showing one example of the transmission 4 shown in FIG. 1. FIG. 3 is a skeleton diagram showing another example of the transmission 4. FIG. 4 is a skeleton diagram showing still another example of the transmission 4. Hereinafter, a configuration of the transmission 4 shown in FIG. 2 will be described. The transmission 4 shown in FIG. 2 is a parallel six-shaft type transmission having five forward gears and one reverse gear, and is a dry-type twin clutch transmission (DCT: Dual Clutch Transmission).

In the transmission 4 of FIG. 2, an inner main shaft IMS connected to the electric motor 3 via a crank shaft (not shown in the drawings) of the engine 2 and a sun gear 71 of a planetary gear mechanism; an outer main shaft OMS forming an external cylinder of this inner main shaft IMS; a secondary shaft SS, a reverse shaft RS and an idle shaft IS respectively parallel to the inner main shaft IMS; and a counter shaft CS forming an output shaft and parallel to these shafts are provided. In this regard, an air conditioner shaft A/CS connected to a compressor A/C for an air conditioner, which is an accessory of the vehicle, via a clutch is provided in the transmission 4 shown in FIG. 2.

The drive shafts including these six shafts and the differential mechanism 5 (D) are arranged so as to engage with (abut on) each other as shown in FIG. 2. Namely, they are arranged so that: the inner main shaft IMS or the outer main shaft OMS engages with the counter shaft CS, the idle shaft IS and the reverse shaft RS; the idle shaft IS engages with the reverse shaft RS and the counter shaft CS; the secondary shaft SS engages with the counter shaft CS; and the counter shaft CS engages with the differential mechanism 5 (D). Further, a belt is looped over so as to cause the air conditioner shaft A/CS to interlock with the reverse shaft RS.

The transmission 4 includes a first clutch C1 for odd gears and a second clutch C2 for even gears. Each of the first and second clutches C1, C2 is a dry-type clutch. The first clutch C1 is connected to the inner main shaft IMS and the second clutch C2 is connected to the outer main shaft OMS.

A carrier 73 of the planetary gear mechanism that becomes a low drive gear, a third drive gear 43, a fifth drive gear 45 and an idle drive gear 52 are fixedly arranged on the outer main shaft OMS in the order from the left side in FIG. 2. Further, a third-fifth synchromesh mechanism (selector mechanism) 82 is provided slidably in an axial direction between the third drive gear 43 and the fifth drive gear 45 of the inner main shaft IMS. Further, a reverse drive gear 50 is fixedly arranged on the inner main shaft IMS.

On the reverse shaft RS, a reverse idle gear 51 is fixedly arranged, and a reverse driven gear 48 is rotatably arranged. Further, a reverse synchromesh mechanism 81 is provided slidably in an axial direction in the vicinity of the reverse driven gear 48 of the reverse shaft RS.

A second drive gear 42 and a fourth drive gear 42 are rotatably arranged and a reverse driven gear 56 is fixedly arranged on the secondary shaft SS in the order from the left side in FIG. 2. Further, a second-fourth synchromesh mechanism 83 is provided slidably in an axial direction between the second drive gear 42 and the fourth drive gear 42 of the secondary shaft SS.

A second-third driven gear 53, a fourth-fifth driven gear 55, a parking gear 58 and a final drive gear 54 are fixedly arranged on the counter shaft CS in the order from the left side in FIG. 2. A final drive gear 54 engages with a differential ring gear 59 of the differential mechanism 5 (D).

An idle driven gear 57 is fixedly arranged on the idle shaft IS. The idle driven gear 57 engages with each of the idle drive gear 52, the reverse driven gear 56 and the differential ring gear 59. In this regard, an output shaft of each of the outer main shaft OMS, the reverse shaft RS, the secondary shaft SS, the counter shaft CS, the idle shaft IS, the air conditioner shaft A/CS and differential mechanism 5 (D) is rotatably held by a ball bearing or roller bearing.

Further, a one-way clutch 41 is provided so as to be fixedly connected to a ring gear 75 of the planetary gear mechanism. In the transmission 4 shown in FIG. 2, the carrier 73 of the planetary gear mechanism is finally connected to a foot shaft via the differential mechanism 5 (D), and the sun gear 71 of the planetary gear mechanism is connected to the electric motor 3 and the engine 2 (not shown in FIG. 2). In this regard, the planetary gears 72, 74 engage with the sun gear 71 and the ring gear 75, respectively.

When a synchro sleeve of the second-fourth synchromesh mechanism 83 is slid to the left, the second drive gear 42 is connected to the secondary shaft SS. When it is slid to the right, the fourth drive gear 42 is connected to the secondary shaft SS. By causing the second clutch C2 to engage at this time, the transmission 4 is caused to be set up to the second gear or fourth gear.

When a synchro sleeve of the third-fifth synchromesh mechanism 82 is slid to the left, the third drive gear 43 is connected to the inner main shaft IMS. When it is slid to the right, the fifth drive gear 45 is connected to the inner main shaft IMS. By causing the first clutch C1 to engage at this time, the transmission 4 is caused to be set up to the third gear or fifth gear.

When a synchro sleeve of the reverse synchromesh mechanism 81 is slid to the right side, the reverse driven gear 48 is connected to the reverse shaft RS. By causing the first clutch C1 to engage at this time, the transmission 4 is caused to be set up to a reverse gear (reverse).

Next, a modified example of the transmission 4 shown in FIG. 3 will be described. In this regard, the same reference numerals are assigned to components similar to those in the transmission 4 shown in FIG. 2. The transmission 4 shown in FIG. 3 is different from the transmission 4 shown in FIG. 2 in that a sun gear 71 of a planetary gear mechanism is not connected to a ring gear 75. Hereinafter, a difference between these transmissions 4 will de described briefly.

In accordance with such a difference, in the planetary gear mechanism of the transmission 4 shown in FIG. 3, the sun gear 71 is connected to the engine 2 (not shown in FIG. 2) in FIG. 2, the ring gear 75 is connected to the electric motor 3, and the carrier 73 is finally connected to the foot shaft via the differential mechanism 5 (D).

Next, a further modified example of the transmission 4 shown in FIG. 4 will be described. In this regard, the same reference numerals are assigned to components similar to those in the transmission 4 shown in FIG. 2. The transmission 4 shown in FIG. 4 is a parallel five-shaft type transmission having seven forward gears and one reverse gear, and is a dry-type twin clutch transmission (DCT: Dual Clutch Transmission).

In the transmission 4 of FIG. 4, the inner main shaft IMS connected to the electric motor 3 via the crank shaft (not shown in the drawings) of the engine 2 and the sun gear 71 of the planetary gear mechanism, an outer main shaft OMS forming an external cylinder of this inner main shaft IMS; a secondary shaft SS, a reverse shaft RS and an idle shaft IS respectively parallel to the inner main shaft IMS; and a counter shaft CS forming an output shaft and parallel to these shafts are provided.

The transmission 4 includes a first clutch C1 for odd gears and a second clutch C2 for even gears. Each of the first and second clutches C1, C2 is a dry-type clutch. The first clutch C1 is connected to the inner main shaft IMS and the second clutch C2 is connected to the outer main shaft OMS.

The carrier 73 of the planetary gear mechanism that becomes the low drive gear, the third drive gear 43, the seventh drive gear 47, the fifth drive gear 45 and the idle drive gear 52 are fixedly arranged on the outer main shaft OMS in order from the left side in FIG. 4. Further, a third-seventh synchromesh mechanism (selector mechanism) 84 is provided slidably in an axial direction between the third drive gear 43 and the seventh drive gear 47 on the inner main shaft IMS. Further, a fifth synchromesh mechanism (selector mechanism) 85 is provided slidably in an axial direction in the vicinity of the fifth drive gear 45. Moreover, a reverse drive gear 50 is fixedly arranged on the inner main shaft IMS.

A reverse idle gear 51 and a reverse idle gear 51 are fixedly arranged on reverse shaft RS in the order from the left side in FIG. 4, and a reverse driven gear 48 is rotatably arranged therebetween. Further, a reverse synchromesh mechanism 81 is provided slidably in an axial direction in the vicinity of the reverse driven gear 48 together with the reverse driven gear 48.

On the secondary shaft SS in the order from the left side in FIG. 4, a second drive gear 42, a sixth drive gear 46 and a fourth drive gear 42 are rotatably arranged, and a reverse driven gear 56 is fixedly arranged. Further, a second-sixth synchromesh mechanism 86 is provided between the second drive gear 42 and the sixth drive gear 46 of the secondary shaft SS slidably in an axial direction. Further, a fourth synchromesh mechanism (selector mechanism) 87 is provided slidably in an axial direction in the vicinity of the fourth drive gear 42.

A second-third driven gear 53, a sixth-seventh driven gear 60, a fourth-fifth driven gear 55, a parking gear 58 and a final drive gear 54 are fixedly arranged on the counter shaft CS in the order from the left side in FIG. 4. The final drive gear 54 engages with a differential ring gear (not shown in the drawings) of the differential mechanism 5.

An idle driven gear 57 is fixedly arranged on the idle shaft IS. The idle driven gear 57 engages with each of the idle drive gear 52, the reverse driven gear 56 and the differential ring gear 59. In this regard, each of the outer main shaft OMS, the reverse shaft RS, the secondary shaft SS, the counter shaft CS and the idle shaft IS is rotatably held by a ball bearing or roller bearing.

In the transmission 4 of FIG. 4, five shift rails are provided. In a first shift rail, by causing the first clutch C1 to engage, the transmission 4 is set up to a low gear when the reverse synchromesh mechanism 81 is in a neutral state. In the case where the synchro sleeve of the reverse synchromesh mechanism 81 is slid to the left side, it is set up to a reverse gear (reverse). In a second shift rail, by causing the second clutch C2 to engage, the transmission 4 is set up to a second gear in the case where the synchro sleeve of the second-sixth synchromesh mechanism 86 is slid to the left side. In the case where the synchro sleeve of the second-sixth synchromesh mechanism 86 is slid to the right side, it is set up to a sixth gear. In a third shift rail, by causing the first clutch C1 to engage, the transmission 4 is set up to a third gear in the case where the synchro sleeve of the third-seventh synchromesh mechanism 84 is slid to the left side. In the case where the synchro sleeve of the third-seventh synchromesh mechanism 84 is slid to the right side, it is set up to a seventh gear. In a fourth shift rail, by causing the second clutch C2 to engage, the transmission 4 is set up to the reverse gear (reverse) in the case where the reverse synchromesh mechanism 81 and the fourth synchromesh mechanism 87 are interlocked and the synchro sleeve of the reverse synchromesh mechanism 81 is slid to the left side. In the case where the synchro sleeve of the fourth synchromesh mechanism 87 is slid to the right side, it is set up to a fourth gear. In a fifth shift rail, by causing the first clutch C1 to engage, the transmission 4 is set up to a parking gear in the case where the synchro sleeve of the fifth synchromesh mechanism 85 is slid to the left side. In the case where the synchro sleeve of the fifth synchromesh mechanism 85 is slid to the right side, it is set up to a fifth gear.

Figure 5:
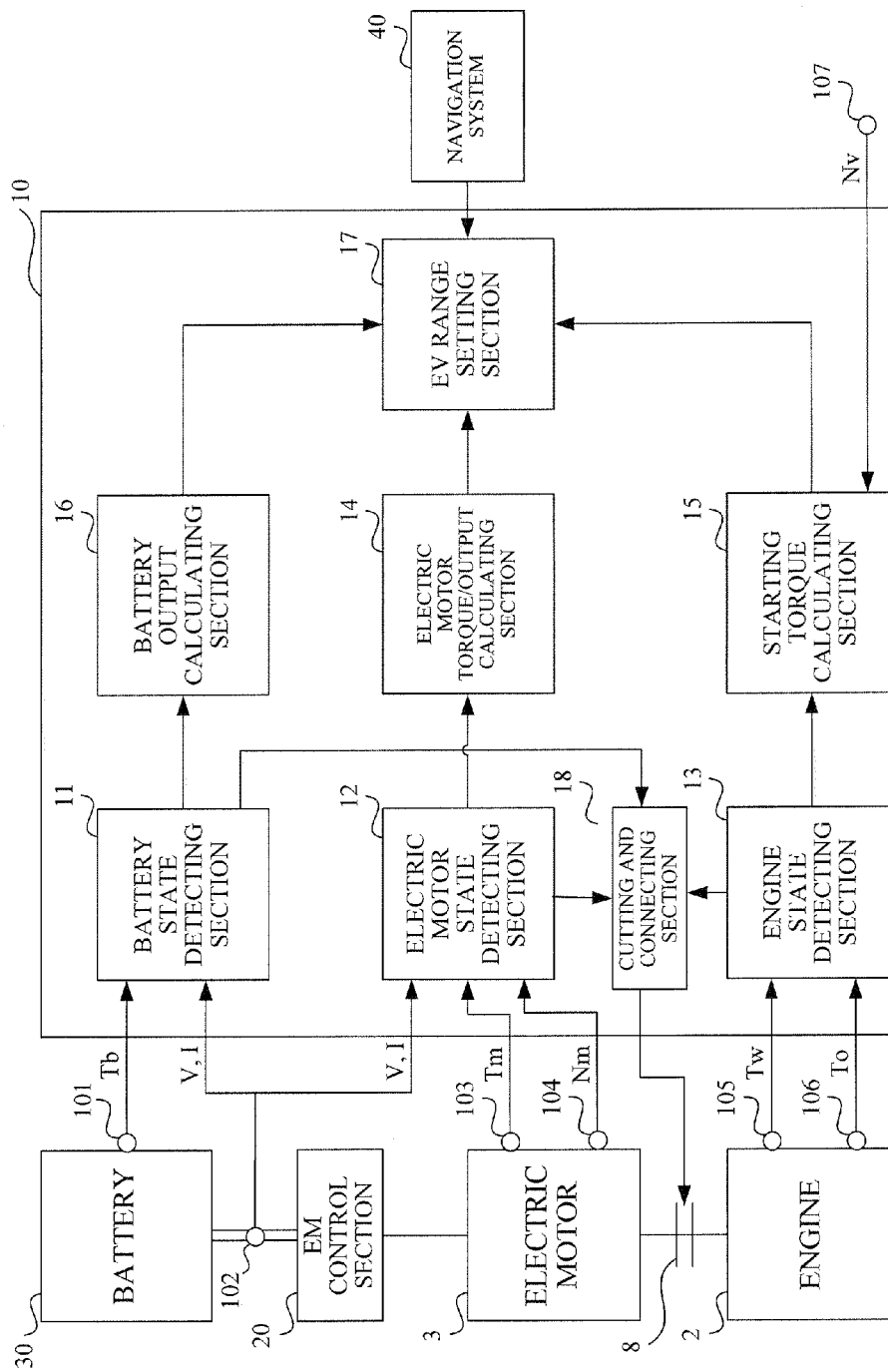
FIG. 5 is a block diagram showing a configuration of an electronic control unit according to a first embodiment.

Next, a configuration of the electronic control unit 10 according to the present embodiment will be described. FIG. 5 is a block diagram showing a configuration of the electronic control unit 10 according to the first embodiment. As shown in FIG. 5, the electronic control unit 10 includes a battery state detecting section 11, an electric motor state detecting section 12, an engine state detecting section 13, an electric motor torque/output calculating section 14, a starting torque calculating section 15, a battery output calculating section 16, an EV range setting section 17, and a cutting and connecting control section 18.

Further, in the vehicle 1 according to the present embodiment, a battery temperature sensor 101 for detecting temperature Tb of the battery 30 is provided in the vicinity of the battery 30. An electric current and voltage sensor 102 for detecting an electric current I, voltage V and an electric current integrated value It of the battery 30 is provided between the battery 30 and the electric motor control section 20. Further, although the illustration thereof is omitted, an inner pressure sensor for detecting inner pressure (battery inner pressure) of the battery 30, an ionic concentration sensor for detecting ionic concentration (battery internal concentration) in electrolyte within the battery 30, and the like may be provided in the battery 30. Detected value of these sensors 101, 102 and the like are outputted to the battery state detecting section 11.

An electric motor temperature sensor 103 for detecting temperature Tm of the electric motor 3 is provided in the vicinity of the electric motor 3, and an electric motor rotation sensor 104 for detecting the number of revolutions Nm of the electric motor 3 is provided in the vicinity of the input shaft or output shaft of the electric motor 3. Detected values of these sensors 103 and 104 are outputted to the electric motor state detecting section 12.

A cooling water temperature sensor 105 for detecting water temperature Tw of cooling water (coolant) to cool the engine 2 and a lubricating oil temperature sensor 106 for detecting oil temperature To of lubricating oil (engine oil) to lubricate the engine 2 are provided in the vicinity of the engine 2.

Moreover, a vehicle speed sensor 107 for detecting vehicle speed Nv of the vehicle 1 is provided at an appropriate position of the vehicle 1. In this regard, without specifically providing the vehicle speed sensor 107 for detecting the vehicle speed Nv, the vehicle speed Nv may be calculated from the number of revolutions Ni of the main shaft (not shown in the drawing) of the engine 2 or the output shaft of the electric motor 3 or the number of revolutions No of the counter shaft (not shown in the drawing) in the transmission 4. For example, the vehicle speed Nv can be detected (or calculated) on the basis of a relational expression such as "Nv=Ni×gear ratio×circumferential length of wheel" or "Nv=No×circumferential length of wheel".

The battery state detecting section 11 acquires (or detects) the temperature Tb of the battery 30 detected by the battery temperature sensor 101 and the electric current I and voltage V of the battery 30 detected by the electric current and voltage sensor 102. The battery state detecting section 11 then calculates a storage amount of the battery 30, that is, SOC on the basis of the electric current I, voltage V of the battery 30 if necessary. The respective detected values detected by the battery state detecting section 11 are outputted to the battery output calculating section 16 and the cutting and connecting control section 18.

Further, the battery state detecting section 11 calculates an electric current integrated value It on the basis of the electric current I of the battery 30. The battery state detecting section 11 similarly acquires (or detects) inner pressure (battery inner pressure) of the battery 30 and ionic concentration (battery internal concentration) in electrolyte within the battery 30 detected by an inner pressure sensor and an ionic concentration sensor (not shown in the drawings). In this regard, in this specification, various kinds of data on the battery 30 collectively mean the state of the battery 30. By detecting the state of the battery 30 in detail in this manner, it is possible to narrow the output restricting range of the electric motor 3 at the EV driving as much as possible.

The electric motor state detecting section 12 acquires (or detects) the temperature Tm of the electric motor 3 detected by the electric motor temperature sensor 103 and the number of revolutions Nm of the electric motor 3 detected by the electric motor rotation sensor 104. The respective detected values detected by the electric motor state detecting section 12 are outputted to the electric motor torque/output calculating section 14 and the cutting and connecting control section 18. In this regard, in this specification, the temperature Tm of the electric motor 3, the number of revolutions Nm and the like collectively mean the state of the electric motor 3.

As described above, the electric motor state detecting section 12 directly detects the electric motor temperature Tm by means of the electric motor temperature sensor 103 for detecting the temperature Tm of the electric motor 3. However, in the case where the electric motor temperature sensor 103 is not provided, the electric motor state detecting section 12 may be configured so as to acquire an electric current conducted to the electric motor 3 detected by the electric current and voltage sensor 102, the torque of the electric motor 3 and the number of revolutions Nm detected by electric motor rotation sensor 104 and to estimate the electric motor temperature from these detected values. By detecting the state of the electric motor 3 in detail in this manner, it is possible to narrow the output restricting range of the electric motor 3 at the EV driving as much as possible.

The engine state detecting section 13 acquires (or detects) the water temperature Tw of cooling water detected by the cooling water temperature sensor 105 and the oil temperature To of the lubricating oil detected by the lubricating oil temperature sensor 106. Although the illustration thereof is omitted, the engine state detecting section 13 acquires (or detects) the number of revolutions Ne of the engine 2 from a rotation sensor for detecting the number of revolutions Ne of the crank shaft of the engine 2. Further, the engine state detecting section 13 detects a position of a piston within each cylinder (not shown in the drawings) of the engine 2. In this regard, a piston position detecting section may be provided in addition to the engine state detecting section 13. The respective detected values detected by the engine state detecting section 13 are outputted to the starting torque calculating section 15 and the cutting and connecting control section 18. In this regard, in this specification, the water temperature Tw of cooling water for the engine 2, the oil temperature To of lubricating oil, the number of revolutions Ne and the like collectively mean the state of the engine 2. By detecting the state of the engine 2 in detail in this manner, it is possible to narrow the output restricting range of the electric motor 3 at the EV driving as much as possible. Thus, since the EV driving range can be enlarged, it is possible to inhibit consumption of fuel by the engine 2. Further, since a threshold value to start the engine 2 (for example, the vehicle speed Nv detected by the vehicle speed sensor 107 reaches predetermined vehicle speed or not, and the like) can be heightened, it is possible to improve gasoline mileage (fuel economy) of the vehicle.

In this regard, the engine state detecting section 13 may detect, when the engine 2 is cut off from the electric motor 3, temperature of the engine 2 on the basis of the water temperature Tw of the cooling water detected by the cooling water temperature sensor 105 or the oil temperature To of the lubricating oil detected by the lubricating oil temperature sensor 106.

Here, in the case where the electric motor 3 is arranged so as to be adjacent to the engine 2, the electric motor state detecting section 12 may utilize the oil temperature To of the lubricating oil or the water temperature Tw of cooling water detected by the engine state detecting section 13 as the temperature Tm of the electric motor 3. This makes it possible to cut down (reduce) a size of the whole detecting apparatus and the number of sensors of the vehicle 1.

The electric motor torque/output calculating section 14 calculates at least one of electric motor torque and an electric motor output that can be outputted from the electric motor 3 and the maximal torque of the electric motor 3 on the basis of the state of the electric motor 3 detected by the electric motor state detecting section 12, that is, the temperature Tm and/or the number of revolutions Nm of the electric motor 3. In this case, the electric motor torque/output calculating section 14 may calculate the output of the electric motor 3 on the basis of the electric current I and the voltage V detected by the electric current and voltage sensor 102, for example. In this regard, in the case where the torque and the number of revolutions Nm of the electric motor 3 are detected by the electric motor state detecting section 12, the electric motor torque/output calculating section 14 may acquire the output that can be outputted from the electric motor 3 by multiplying the torque of the electric motor 3 by the number of revolutions Nm. The calculated torque or output of the electric motor 3 and the maximal torque are outputted to the EV range setting section 17.

The starting torque calculating section 15 calculates engine starting torque required to start the engine 2 on the basis of the state of the engine 2 detected by the engine state detecting section 13, that is, the water temperature Tw of the cooling water or the oil temperature To of the lubricating oil. The torque (engine starting torque) required to restart the stopping engine 2 depends upon temperature of the engine 2 at that time. For this reason, in order to determine a temperature state of the engine 2, the water temperature Tw of the cooling water and/or the oil temperature To of the lubricating oil are used in the present embodiment. In this regard, the calculated engine starting torque is outputted to the EV range setting section 17.

Further, the starting torque calculating section 15 may newly calculate, as the engine starting torque, a value obtained by subtracting a lower limit according to the vehicle speed Nv detected by the vehicle speed sensor (vehicle speed detecting section) 107 from the engine starting torque calculated as described above. Since the number of revolutions Nm of the electric motor 3 becomes high-speed rotation depending upon the vehicle speed Nv, inertial force is applied to the crank shaft of the engine 2. For that reason, the engine starting torque is corrected so as to prevent the range allowing the EV driving from becoming too narrow by overrestricting an EV range (will be described later) when the EV range is to be set up. This makes it possible to inhibit the output restricting of the electric motor 3 effectively.

The battery output calculating section 16 calculates a battery output that can be outputted by the battery 30 on the basis of at least one of the temperature Tb of the battery 30 detected by the battery temperature sensor 101 and the electric current I, voltage V of the battery 30 detected by the electric current and voltage sensor 102, and outputs the calculated battery output to the EV range setting section 17.

The EV range setting section 17 sets up the EV range in which the engine 2 is cut off from the electric motor 3 and the vehicle can be driven with only the electric motor 3, on the basis of: the battery output that can be outputted by the battery 30, which is calculated by the battery output calculating section 16; at least one of the electric motor torque and electric motor output that can be outputted from the electric motor 3, which is calculated by the electric motor torque/output calculating section 14; and the engine starting torque required to start the engine 2, which is calculated by the starting torque calculating section 15.

More specifically, the EV range setting section 17 compares the battery output of the battery 30 with the electric motor torque or electric motor output of the electric motor 3 to select any lower one therefrom, and sets up, as the EV range, a range obtained by adding the range, obtained by subtracting the engine starting torque from the selected torque or output, into the range, obtained by subtracting the engine starting torque from the electric motor maximal torque.

In this regard, in the case where the engine state detecting section 13 detects temperature of the engine 2 when the engine 2 is cut off from the electric motor 3 and the detected temperature data are stored in a memory (not shown in the drawings), the EV range setting section 17 may set up the EV range on the basis of the temperature of the engine 2 when separating stored in the memory in this manner. The temperature of the engine 2 drops when the engine 2 is cut off. However, it is possible to estimate temperature of the engine 2 when the engine 2 is again connected to the electric motor 3 on the basis of the temperature of the engine 2 at separation, elapsed time and the like.

Figure 7A:
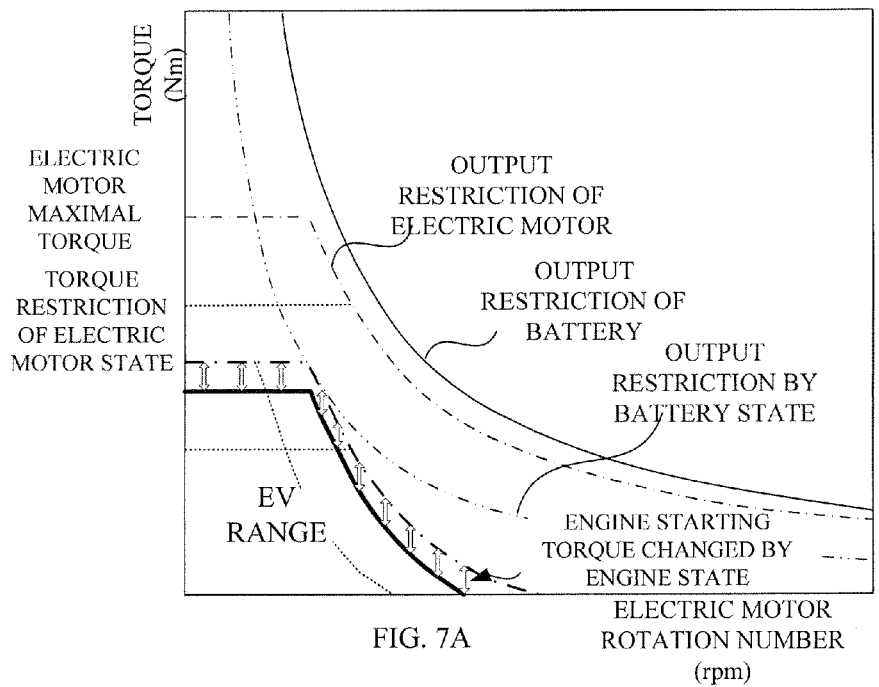
FIG. 7 is a torque/rotation number characteristics map of the electric motor for explaining the method of setting up the EV range.
Figure 7B:
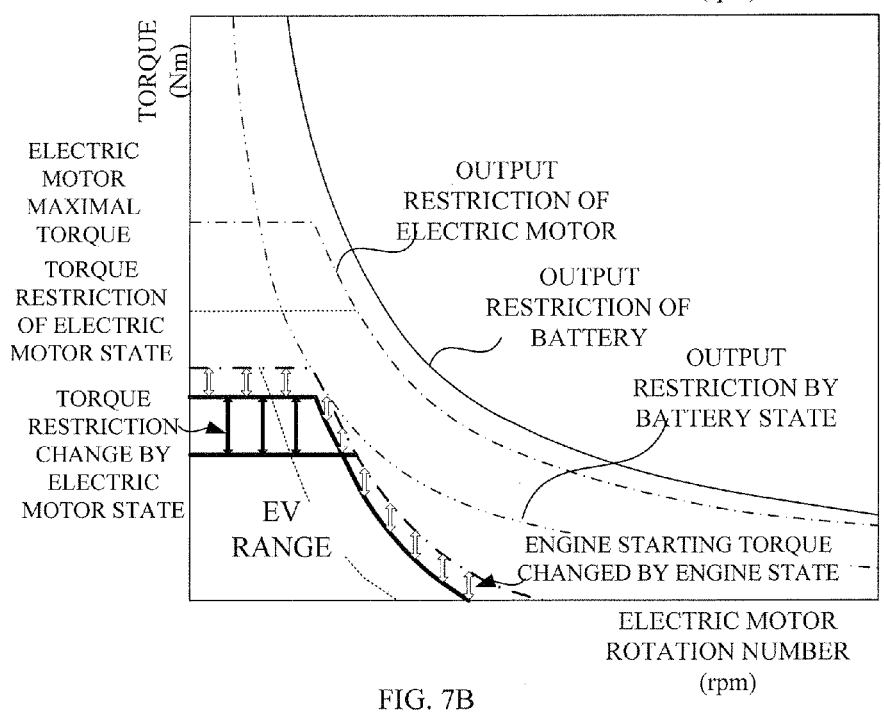
Figure 8:
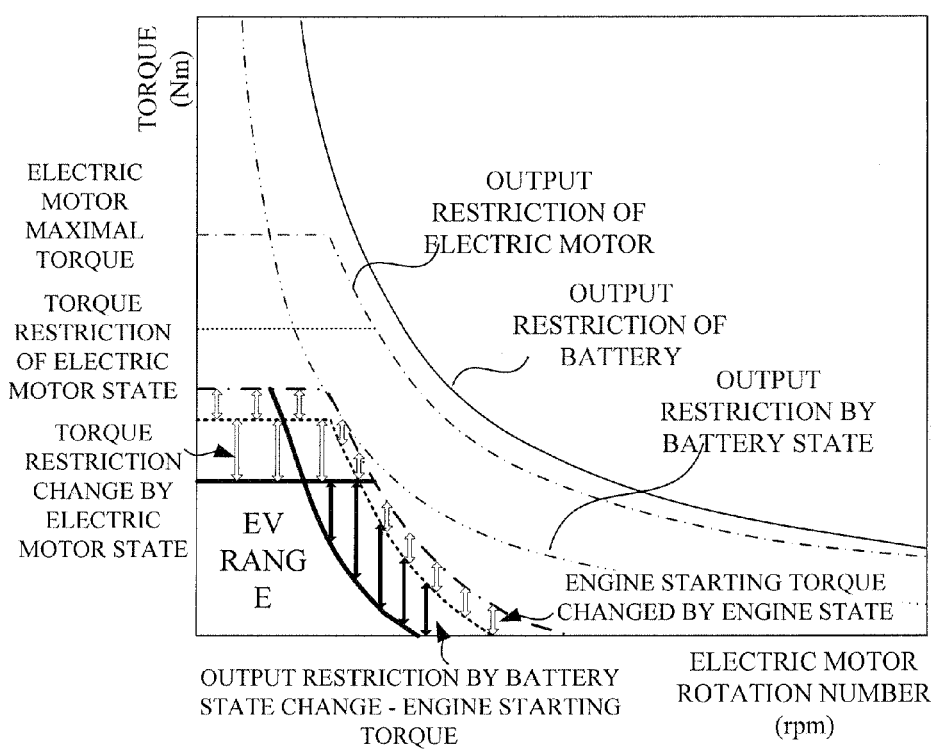
FIG. 8 is a torque/rotation number characteristics map of the electric motor for explaining the method of setting up the EV range.

Here, a method of setting up an EV range by means of the EV range setting section 17 will be described using torque/ rotation number characteristics maps for the electric motor 3 of FIG. 6 to FIG. 8. FIG. 6 to FIG. 8 are torque/rotation number characteristics maps for the electric motor 3 for explaining a method of setting up the EV range (EV driving range).

Figure 6A:
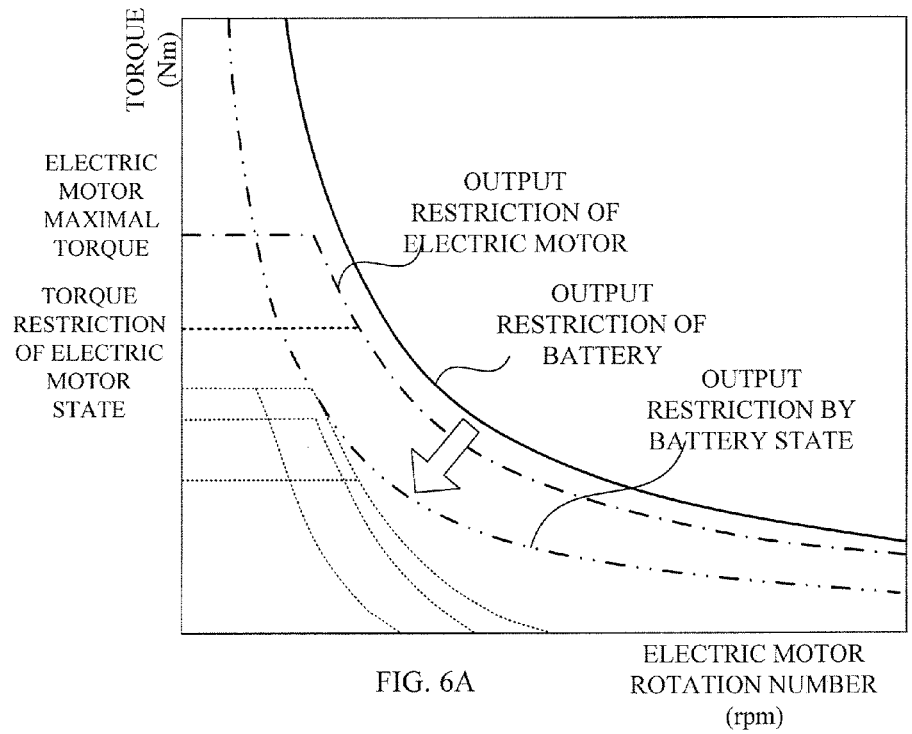
FIG. 6 is a torque/rotation number characteristics map of an electric motor for explaining a method of setting up an EV range.

In FIG. 6A, an output restricting value of the battery 30 is first acquired on the basis of performance of the battery 30 with respect to the electric motor 3 as shown by a solid line of FIG. 6A. On the other hand, when the temperature Tb and the storage amount of the battery 30, that is, the state of the battery 30 such as the SOC are detected by the battery state detecting section 11, a range of the battery that can be outputted is determined on the basis of this state of the battery 30, output restriction due to the state of the battery 30 is carried out as shown by a dashed double-dotted line of FIG. 6A.

Subsequently, as the output restriction of the electric motor 3, an output restricting value for the electric motor in accordance with the electric motor maximal torque and the number of revolutions Nm of the electric motor is acquired as shown by a dashed dotted line of FIG. 6A. On the other hand, when the state of the electric motor 3 such as the temperature Tm of the electric motor 3 and the number of revolutions Nm is detected by the electric motor state detecting section 12, torque restriction of the electric motor 3 due to the state of the electric motor 3 is carried out on the basis of this state of the electric motor 3 as shown by dotted lines of FIG. 6A.

The EV range setting section 17 then compares the output restriction of the battery 30 by the state of the battery 30 with the torque restriction of the electric motor 3 by the state of the electric motor 3, and selects lower one, here, the output restriction of the battery 30 by the state of the battery 30.

Figure 6B:
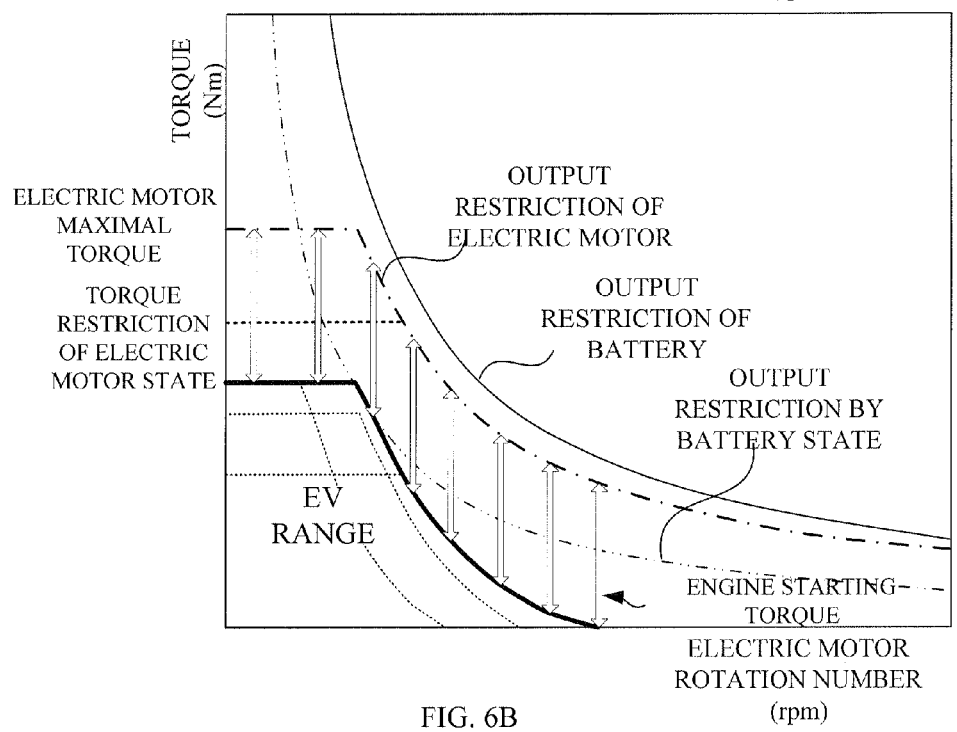

Subsequently, in FIG. 6B, the EV range setting section 17 sets up, as the EV range, a range obtained by adding the range, obtained by subtracting the engine starting torque from the output restriction of the battery 30 due to the state of the battery 30 selected in FIG. 6A, to the range, obtained by subtracting the engine starting torque from the electric motor maximal torque. Here, the range obtained by subtracting the engine starting torque from the output restriction of the battery 30 due to the state of the battery 30 selected in FIG. 6A is lower than the range obtained by subtracting the engine starting torque from the electric motor maximal torque in the whole electric motor rotation number range. Therefore, the EV range setting section 17 sets up, as the EV range, a range (within the range shown by a heavy solid line in FIG. 6B) obtained by subtracting the engine starting torque as shown by up down arrows of FIG. 6B from the electric motor maximal torque.

Subsequently, in FIG. 7A, the starting torque calculating section 15 calculates the engine starting torque again on the basis of a change in the state of the engine 2 detected by the engine state detecting section 13, and the EV range setting section 17 newly sets up, as the EV range, a range (within a range shown by a heavy solid line in FIG. 7A) obtained by subtracting the engine starting torque changed due to the state of the engine 2 as shown by up down arrows of FIG. 7A from the EV range set up in FIG. 6B.

Subsequently, in FIG. 7B, the electric motor torque/output calculating section 14 again calculates at least one of the electric motor torque or electric motor output that can be outputted from the electric motor 3 on the basis of a change in the state of the electric motor 3 detected by the electric motor state detecting section 12, the EV range setting section 17 newly sets up, as the EV range, a range (within the range below two heavy solid lines in FIG. 7B) obtained by subtracting a change in the torque restriction due to the state of the electric motor 3 as shown by up down arrows with black of FIG. 7B from the EV range set up in FIG. 7A.

Subsequently, in FIG. 8, the battery output calculating section 16 again calculates the battery output that can be outputted by the battery 30 on the basis of a change in the state of the battery 30 detected by the battery state detecting section 11, and the EV range setting section 17 newly sets up, as the EV range, a range (within the range below two heavy solid lines in FIG. 8) obtained by subtracting a change in the output restriction due to the state change of the battery 30 as shown by up down arrows with black in FIG. 8 from the EV range set up in FIG. 7B.

In this way, the EV range setting section 17 corrects, at timing of carrying out an EV range setting process (will be described later), a change in the engine starting torque of the engine 2, a change in the torque or output of the electric motor 3 and a change in the battery output of the battery 30 which are based upon the fact that any of the state of the engine 2, the state of the electric motor 3 and the state of the battery 30 is changed with respect to the EV range first set up as described above (see FIG. 6B), and newly sets up the EV range.

Returning to FIG. 5, after driving force required of the electric motor 3 from the electronic control unit 10 exceeds the EV range to shift from the EV driving with only the electric motor 3 to the collaboration driving between the engine 2 and the electric motor 3, the EV range setting section 17 may move a boundary of the EV range (shift point between the EV driving and the collaboration driving) in such a direction not to shift from the collaboration driving to the EV driving for a certain period of time. Namely, the EV range setting section 17 may set up the EV range so as to become smaller in this case.

Further, after shifting from the collaboration driving between the engine 2 and the electric motor 3 to the EV driving, the EV range setting section 17 may move a boundary of the EV range (shift point between EV driving and collaboration driving) in such a direction that shift from the EV driving to the collaboration driving is not carried out so that the EV driving can be maintained for a certain period of time. Namely, the EV range setting section 17 may set up the EV range so as to be enlarged in this case.

In this way, by moving the boundary of the EV range for a certain period of time when the driving state is shifted between the EV driving and the collaboration driving, it is possible to prevent hunting to frequently switch between the EV driving and the collaboration driving from occurring. Therefore, there is no harmful influence on drivability of the driver of the vehicle 1.

The cutting and connecting control section 18 controls the cutting and connecting section 8 so as to cut off the engine 2 from the electric motor 3 or to connect the engine 2 to the electric motor 3 in accordance with a driving state of the vehicle 1. Then, in the case where it is determined that it is difficult to restart the engine 2 in a state that the engine 2 is cut off from the electric motor 3 on the basis of the remaining capacity (SOC) of the battery 30, the cutting and connecting control section 18 causes the cutting and connecting section 8 not to cut off the engine 2 (inhibit).

In the case where the driving force required of the electric motor 3 exceeds the EV range while the vehicle 1 is driven with only the electric motor 3, the cutting and connecting control section 18 causes the cutting and connecting section 8 to connect the electric motor 3 to the engine 2. It may be controlled so that the cutting and connecting section 8 cuts off this connection after push starting of the engine 2 by ensuring the engine starting torque required to start the engine 2 from the electric motor 3 in this manner, and the cutting and connecting section 8 then connects the electric motor 3 to the engine 2 again at the time when the number of revolutions of the engine 2 becomes equivalent to the number of revolutions of the input shaft of the electric motor 3 at the EV driving. This makes it possible to supply the output of the electric motor 3 to the drive wheels 7R, 7L to the maximum during the EV driving while inhibiting shock at start of the engine 2 from being transmitted to the drive wheels 7R, 7L. Therefore, since the shock to the drive wheels 7R, 7L due to connection between the electric motor 3 and the engine 2 in a state that rotation of the engine 2 is unstable can be inhibited, there is no harmful influence on drivability of the driver.

Further, in the case as described above, when the cutting and connecting control section 18 controlled the electric motor 3 and the engine 2 to be cut off from each other after the electric motor 3 is connected to the engine 2 by means of the cutting and connecting section 8 in order to start the engine 2, the EV range setting section 17 may increase the EV range by the engine starting torque. Here, since the engine 2 has already started, it is possible to utilize the engine starting torque in the electric motor torque restricted at stop of the engine 2 for the EV driving.

Further, the vehicle 1 further includes a navigation system 40 for navigating driving of the driver of the vehicle 1. Although the illustration thereof is omitted, this navigation system 40 includes therein a control section, a memory, a map drawing section, an induced route drawing section, an audio outputting section and the like.

The navigation system 40 can specify a current location of its vehicle by means of a GPS sensor, a distance sensor, an angle sensor and the like provided at appropriate positions of the vehicle 1, and acquire information on an upward slope and a downward slope on a route in map data (slope information and distance information). In this regard, the GPS sensor receives a GPS signal transmitted from a GPS satellite to detect longitude and latitude of the current location of the vehicle 1; the distance sensor measures a travel distance of the vehicle 1 from a predetermined position; and the angle sensor measures a traveling direction of the vehicle 1.

Here, the EV range setting section 17 may determine whether regeneration of the electric motor 3 may be carried out in the future or not on the basis of a navigation state in the navigation system 40, that is, whether there is a downward slope on the route or not and the like. In the case where it is determined that the regeneration of the electric motor 3 may be carried out in the future, the EV range setting section 17 may increase the EV range. Since the battery 30 can be charged by regeneration brake of the electric motor 3 on a downward slope, there is no problem concerning the EV driving even though the EV driving range is enlarged.

Figure 9:
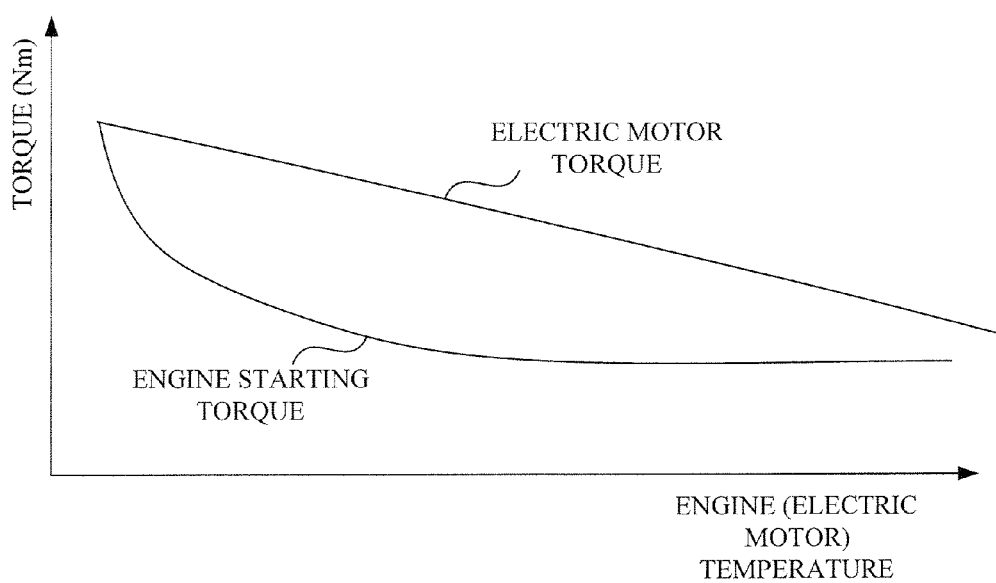
FIG. 9 is a torque characteristic drawing of the engine and the electric motor.

Next, a relationship between the starting torque of the engine 2 and the output torque of the electric motor 3 and temperature of the engine 2 and the electric motor 3 will be described briefly. FIG. 9 is a torque characteristic drawing of the engine 2 and the electric motor 3. As shown in FIG. 9, torque characteristics of the output torque with respect to temperature of the electric motor 3 has a relationship so that the output torque of the electric motor 3 decreases as the temperature of the electric motor 3 increases. On the other hand, torque characteristics of the engine starting torque with respect to temperature of the engine 2 has a relationship so that the engine starting torque decreases sharply when temperature of the engine 2 is low, but the engine starting torque changes little at predetermined temperature or higher.

In the present invention, a relationship among the engine starting torque of the engine 2, output torque of the electric motor 3 and each temperature is focused on, and particularly by being corrected with respect to the temperature in a region in which a difference between the engine starting torque and the electric motor torque at the same temperature, it is possible to enlarge the EV range in which the vehicle 1 can be driven with only the electric motor 3.

Figure 10:
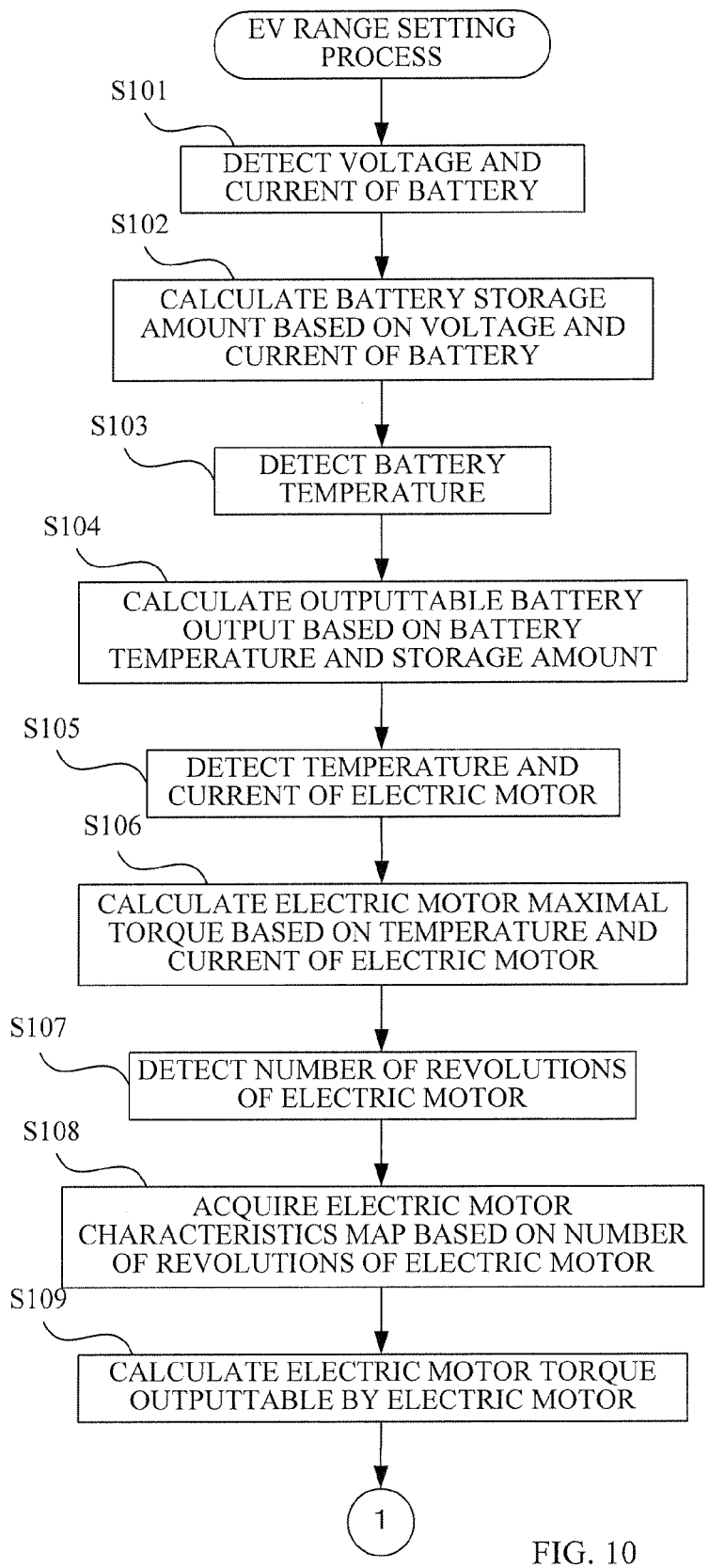
FIG. 10 is a flowchart showing an EV range setting process carried out by the electronic control unit shown in FIG. 5.
Figure 11:
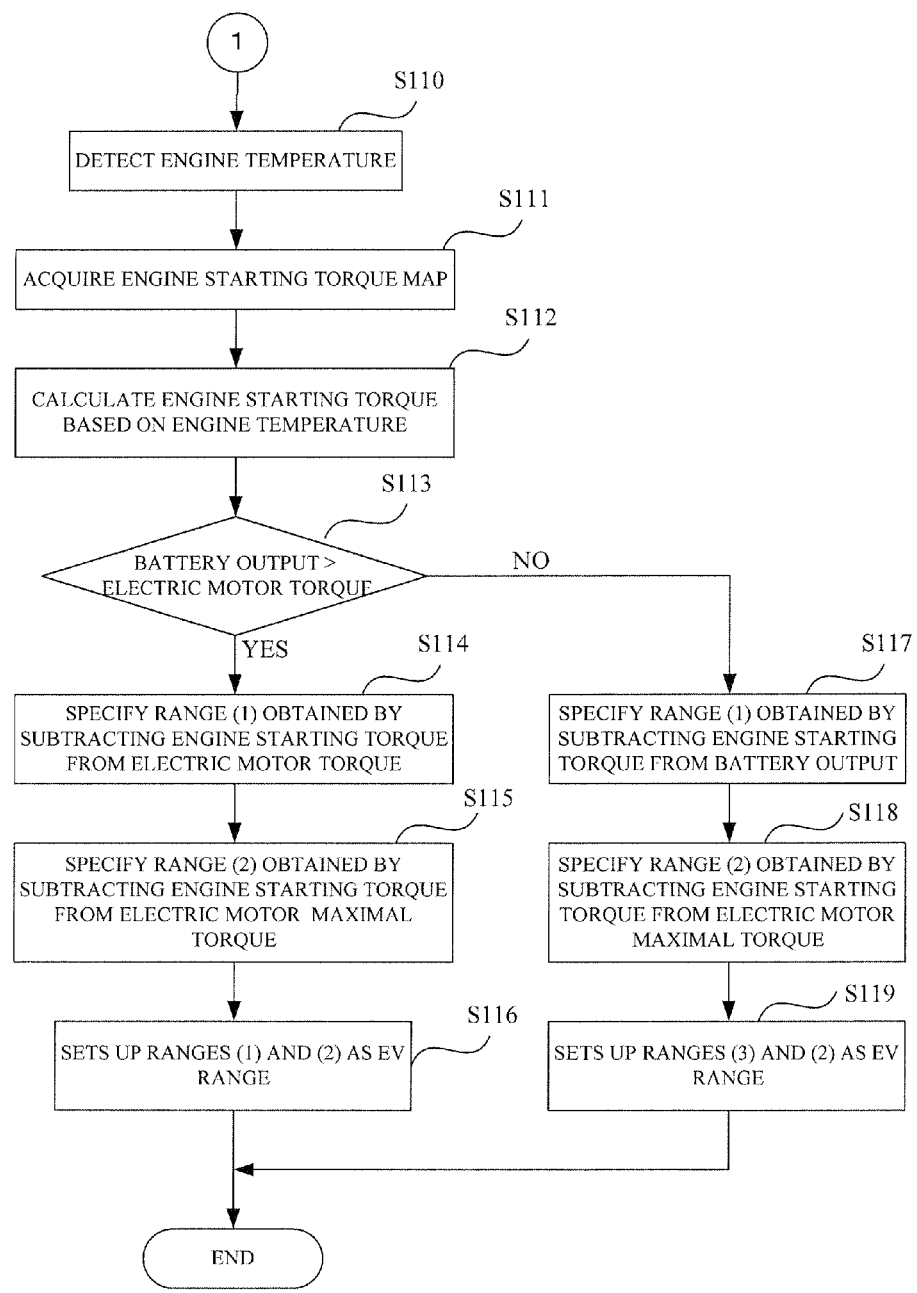
FIG. 11 is a flowchart showing the EV range setting process carried out by the electronic control unit shown in FIG. 5.

Next, an operation of the power output apparatus according to the present embodiment will be described with reference to the block diagram of FIG. 5 and a flowchart of FIG. 10 and FIG. 11. FIG. 10 and FIG. 11 are a flowchart showing an EV range setting process carried out by the electronic control unit 10 shown in FIG. 5. This EV range setting process is carried out at a predetermined time interval after start of the vehicle 1 (after ignition ON), in which an EV range to be set up is updated.

In the EV range setting process according to the present embodiment, the battery state detecting section 11 first detects voltage V and electric current I of the battery 30 via the electric current and voltage sensor 102 (Step S101), and calculates a storage amount of the battery 30, that is, SOC on the basis of the detected voltage V and electric current I of the battery 30 (Step S102).

Subsequently, the battery state detecting section 11 detects temperature Tb of the battery 30 via the battery temperature sensor 101 (Step S103), and outputs the storage amount SOC and the temperature Tb of the battery 30 to the battery output calculating section 16. The battery output calculating section 16 calculates a battery output that can be outputted by the battery 30 on the basis of the storage amount SOC and the temperature Tb of this battery 30 (Step S104), and outputs the calculated battery output to the EV range setting section 17.

Subsequently, the electric motor state detecting section 12 detects temperature Tm and a current value of the electric motor 3 via the electric current and voltage sensor 102 and the electric motor temperature sensor 103 (Step S105); the electric motor torque/output calculating section 14 calculates electric motor maximal torque on the basis of the temperature Tm and the current value of this electric motor 3 (Step S106); and outputs the calculated electric motor maximal torque to the EV range setting section 17.

Subsequently, the electric motor state detecting section 12 detects the number of revolutions Nm of the electric motor 3 via the electric motor rotation sensor 104 (Step S107). The electric motor torque/output calculating section 14 acquires an electric motor characteristics map indicating a relationship between torque of the electric motor and the number of revolutions on the basis of the number of revolutions Nm of this electric motor 3 (Step S108); calculates the electric motor torque that can be outputted by the electric motor 3 on the basis of this electric motor characteristics map (Step S109), and outputs the calculated electric motor torque to the EV range setting section 17.

Subsequently, the engine state detecting section 13 detects temperature of the engine 2 (substituted by the water temperature Tw of cooling water or the oil temperature To of lubricating oil) via the cooling water temperature sensor 105 or the lubricating oil temperature sensor 106 (Step S110). The starting torque calculating section 15 acquires an engine starting torque map indicating a relationship between starting torque and temperature of the engine 2 (Step S111); calculates engine starting torque required at this time on the basis of the temperature of the engine 2 detected at Step S110 (Step S112); and outputs the calculated engine starting torque to the EV range setting section 17. In this regard, in the case where an installation position of the engine 2 is near an installation position of the electric motor 3, it is possible to utilize, as the temperature Tm of electric motor 3, the water temperature Tw of cooling water or the oil temperature To of lubricating oil detected by the cooling water temperature sensor 105 or the lubricating oil temperature sensor 106 without providing the electric motor temperature sensor 103. However, in the vehicle according to the present embodiment, since a region to carry out solo EV driving by the electric motor 3 is wide, it is need to install the electric motor temperature sensor 103 for specifically detecting the temperature Tm of the electric motor 3.

Subsequently, the EV range setting section 17 determines whether the battery output calculated at Step S104 is larger than the electric motor output calculated at Step S109 or not (or which is smaller between them) (Step S113).

In the case where it is determined that the battery output is larger than the electric motor torque, the EV range setting section 17 specifies a range (1) obtained by subtracting the engine starting torque from the electric motor torque (Step S114), and specifies a range (2) obtained by subtracting the engine starting torque from the electric motor maximal torque (Step S115). The EV range setting section 17 then sets up a range obtained by adding these ranges (1) and (2) as the EV range (Step S116), and terminates this EV range setting process.

On the other hand, in the case where it is determined at Step S113 that the battery output is smaller than the electric motor torque, the EV range setting section 17 specifies a range (3) obtained by subtracting the engine starting torque from the battery output (Step S117), and specifies the range (2) obtained by subtracting the engine starting torque from the electric motor maximal torque (Step S118). The EV range setting section 17 then sets up a range obtained by adding these ranges (3) and (2) as the EV range (Step S119), and terminates this EV range setting process.

In this regard, the starting torque calculating section 15 may newly calculate a value obtained by subtracting a lower limit from the vehicle speed Nv detected by the vehicle speed sensor 107 as the engine starting torque. Further, the battery state detecting section 11 detects inner pressure (battery inner pressure) of the battery 30, ionic concentration (battery internal concentration) in electrolyte within the battery 30 and the like, and the battery output calculating section 16 may correct the battery output on the basis of these detect data.

Further, the electric motor state detecting section 12 may estimate the temperature Tm of the electric motor 3 on the basis of the conducted amount, torque and the number of revolutions of the electric motor 3. In the case where the electric motor 3 is arranged so as to be adjacent to the engine 2, the temperature of the engine 2 (the cooling water temperature Tw or the lubricate oil temperature To) may be utilized without directly detecting the temperature Tm of the electric motor 3.

As explained above, in the power output apparatus according to the first embodiment, the battery output calculating section 16 calculates the battery output that can be outputted by the battery 30 on the basis of at least one of the state and the storage amount SOC of the battery 30 detected by the battery state detecting section 11; the electric motor torque/output calculating section 14 calculates the electric motor torque or electric motor output that can be outputted from the electric motor 3 and the maximal torque of the electric motor 3 on the basis of the temperature Tm and the number of revolutions Nm of the electric motor 3 detected by the electric motor state detecting section 12; the starting torque calculating section 15 calculates the engine starting torque required to start the engine 2 on the basis of the water temperature Tw of cooling water for the engine 2 or the oil temperature To of lubricating oil detected by the engine state detecting section 13; the EV range setting section 17 compares the battery output of the battery 30 with the electric motor torque or electric motor output of the electric motor 3 to select any lower one therefrom; and sets up, as the EV range, the range obtained by adding the range, obtained by subtracting the engine starting torque from the selected torque or output, into the range, obtained by subtracting the engine starting torque from the electric motor maximal torque.

The power output apparatus (electronic control unit 10) according to the present embodiment is configured in this manner. Therefore, in the case where an output more than the output of the EV range for the electric motor 3 is further required during EV (Electric Vehicle) driving of the vehicle 1, that is, when the vehicle 1 is driven with only the electric motor 3, it is possible to shift to collaboration driving in which driving forces of the engine 2 and the electric motor 3 are outputted to the drive wheels 7R, 7L by causing the engine 2 to start by means of the engine starting torque left in advance. Even in a conventional manner, an output of the electric motor 3 has been restricted by torque required to start (push starting) the engine 2. However, the torque of the electric motor 3 has been restricted uniformly without regard for the states of the engine 2, the electric motor 3 and the battery 30. For that reason, the EV range may be restricted too much even though the EV driving is possible. However, in the power output apparatus according to the present embodiment, the EV range is set up as wide as possible taking the states of the engine 2, the electric motor 3 and the battery 30 into consideration. Therefore, it is possible to set up the EV range more precisely. This makes it possible to ensure the EV range to the maximum while ensuring merchantability at start of the engine 2 of the vehicle 1.

Second Embodiment

Next, a second embodiment according to the present invention will be described. Since a vehicle according to the present embodiment has the similar configuration to that of the vehicle 1 according to the first embodiment, detailed explanation of a configuration of the vehicle 1 is omitted here. The present embodiment is different from the first embodiment in that an EV range is set up without calculating electric motor torque or electric motor output.

Figure 12:
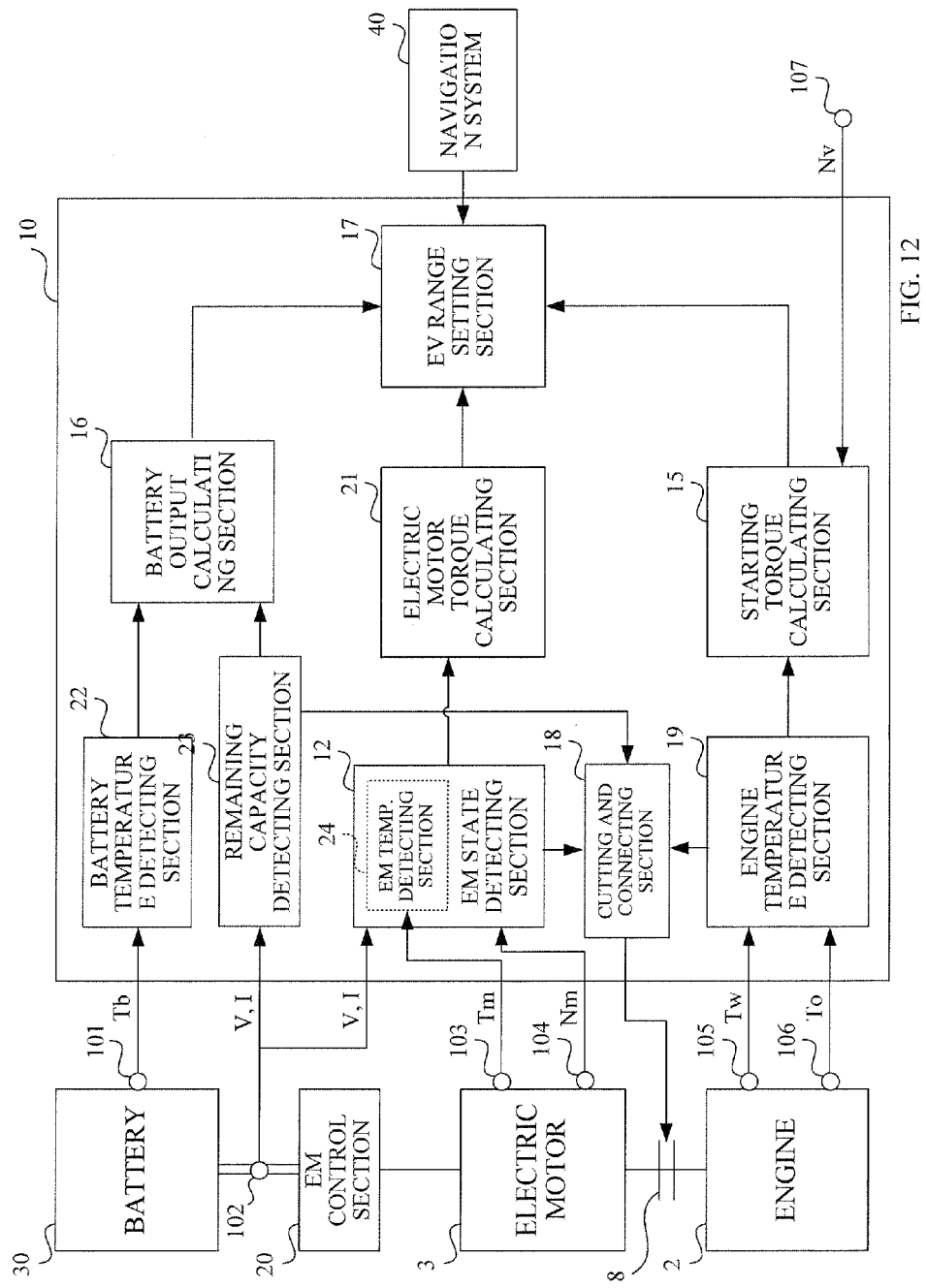
FIG. 12 is a block diagram showing a configuration of an electronic control unit according to a second embodiment.

A configuration of an electronic control unit according to the present embodiment will first be described. FIG. 12 is a block diagram showing a configuration of the electronic control unit 10 according to a second embodiment. In this regard, the same reference numerals are assigned to constituent elements similar to those in the electronic control unit 10 according to the first embodiment, and its explanation with no relation to the functions of the present embodiment is omitted.

As shown in FIG. 5, the electronic control unit 10 includes, in place of the battery state detecting section 11 according to the first embodiment, a battery temperature detecting section 22 for detecting temperature Tb of the battery 30 and a remaining capacity detecting section 23 for calculating a remaining capacity of the battery 30. Further, the electric motor state detecting section 12 of the electronic control unit 10 includes an electric motor temperature detecting section 24 for detecting temperature of the electric motor 3: Moreover, the electronic control unit 10 according to the present embodiment includes, in place of the engine state detecting section 13 according to the first embodiment, an engine temperature detecting section 19 for detecting temperature of the engine 2.

The battery temperature detecting section 22 detects temperature Tb of the battery 30 via the battery temperature sensor 101, and outputs the detected temperature Tb of the battery 30 to the battery output calculating section 16. The remaining capacity detecting section 23 calculates a remaining capacity SOC of the battery 30 on the basis of the electric current I and voltage V of the battery 30 detected by the electric current and voltage sensor 102, and outputs the calculated remaining capacity SOC of the battery 30 to the battery output calculating section 16.

The battery output calculating section 16 calculates a battery output that can be output by the battery 30 on the basis of the remaining capacity SOC of the battery 30 inputted from the remaining capacity detecting section 23 and the temperature Tb of the battery 30 inputted from the battery temperature detecting section 22.

The electric motor torque calculating section 21 calculates electric motor maximal torque that can be outputted from the electric motor 3 on the basis of the temperature Tm of the electric motor 3 detected by the electric motor temperature detecting section 24 in the electric motor state detecting section 12 via the electric motor temperature sensor 103.

The starting torque calculating section 15 calculates engine starting torque required to start the engine 2 on the basis of the water temperature Tw of cooling water for the engine 2 or the oil temperature To of the lubricating oil detected by the engine temperature detecting section 19 via the cooling water temperature sensor 105 or the lubricating oil temperature sensor 106.

The EV range setting section 17 calculates the electric motor output range from the battery output of the battery 30, the engine starting torque of the engine 2 and the electric motor maximal torque of the electric motor 3, and sets up, as the EV range, a range in which the calculated electric motor output range is set up to the maximal torque.

In this regard, the electric motor torque calculating section 21 may calculate the electric motor torque or electric motor output corrected for the temperature Tm of the electric motor 3 on the basis of the temperature Tm of the electric motor 3 detected by the electric motor temperature detecting section 24; and the EV range setting section 17 may set up, as the EV range, a range in which the electric motor torque is set to the maximal torque so as to fit in a predetermined range from the battery output.

Figure 13:
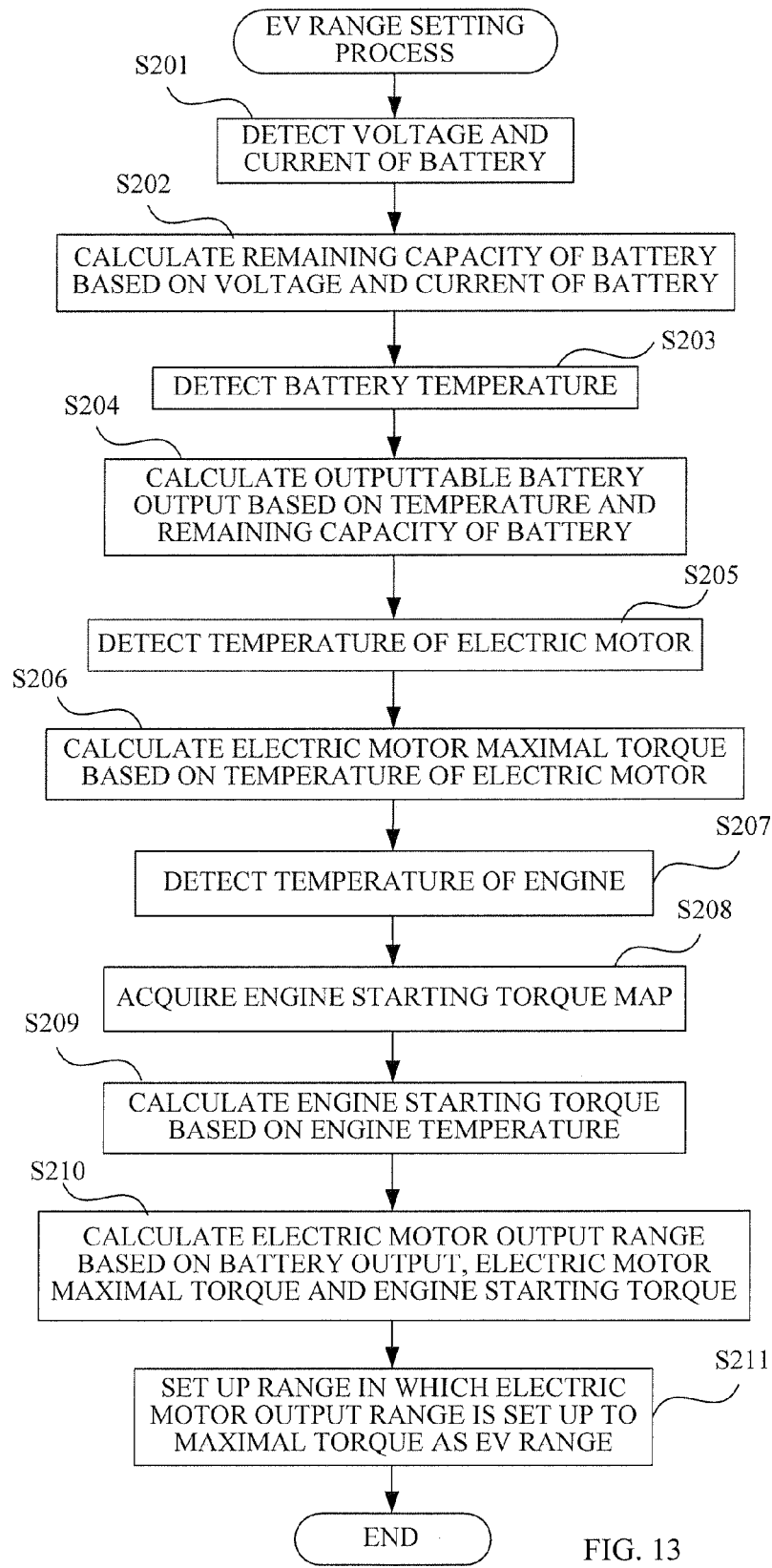
FIG. 13 is a flowchart for showing an EV range setting process carried out by the electronic control unit shown in FIG. 12.

Next, an operation of the power output apparatus according to the present embodiment will be described with reference to the block diagram of FIG. 12 and a flowchart of FIG. 13. FIG. 13 is a flowchart for showing an EV range setting process carried out by the electronic control unit 10 shown in FIG. 12. As well as the first embodiment, this EV range setting process is carried out at a predetermined time interval after start of the vehicle 1 (after ignition ON) to update an EV range to be set up.

In the EV range setting process according to the present embodiment, the remaining capacity detecting section 23 first detects voltage V and an electric current of the battery 30 via the electric current and voltage sensor 102 (Step S201), and calculates a remaining capacity of the battery 30 on the basis of the detected voltage V and electric current I of the battery 30 (Step S202). The remaining capacity detecting section 23 outputs the calculated remaining capacity of the battery 30 to battery output calculating section 16.

Subsequently, the battery temperature detecting section 22 detects temperature Tb of the battery 30 via the battery temperature sensor 101 (Step S203), and outputs the temperature Tb of the battery 30 to the battery output calculating section 16. The battery output calculating section 16 calculates a battery output that can be outputted by the battery 30 on the basis of a remaining capacity and temperature Tb of the battery 30 (Step S204), and outputs the calculated battery output to the EV range setting section 17.

Subsequently, the electric motor temperature detecting section 24 detects temperature Tm of the electric motor 3 via the electric motor temperature sensor 103 (Step S205), and the electric motor torque calculating section 21 calculates electric motor maximal torque on the basis of this temperature Tm of the electric motor 3 (Step S206), and outputs the calculated electric motor maximal torque to the EV range setting section 17.

Subsequently, the engine temperature detecting section 19 detects temperature of the engine 2 (substituted by the water temperature Tw of cooling water or the oil temperature To of lubricating oil) via the cooling water temperature sensor 105 or the lubricating oil temperature sensor 106 (Step S207). The starting torque calculating section 15 acquires an engine starting torque map indicating a relationship between starting torque and temperature of the engine 2 (Step S208), and calculates engine starting torque on the basis of the temperature of the engine 2 detected at Step S207 (Step S209). The starting torque calculating section 15 then outputs the calculated engine starting torque to the EV range setting section 17.

Subsequently, the EV range setting section 17 calculates an electric motor output range on the basis of the battery output calculated at Step S204, the electric motor maximal torque calculated at Step S206, and engine starting torque calculated at Step S209 (Step S210); sets up a range in which the calculated electric motor output range is set up to the maximal torque as the EV range (Step S211); and terminates this EV range setting process.

As explained above, in the power output apparatus according to the second embodiment, the remaining capacity detecting section 23 detects the remaining capacity of the battery 30 on the basis of the electric current I and voltage V of the battery 30; the battery temperature detecting section 22 detects the temperature Tb of the battery 30; the battery output calculating section 16 calculates the battery output that can be outputted by the battery 30 on the basis of the remaining capacity of the battery 30 detected by the remaining capacity detecting section 23 and the temperature Tb of the battery 30 detected by the battery temperature detecting section 22; the electric motor state detecting section 12 detects the state of the electric motor 3; the electric motor torque calculating section 21 calculates the electric motor maximal torque that can be outputted from the electric motor 3 on the basis of the state of the electric motor 3 detected by the electric motor state detecting section 12; the engine temperature detecting section 19 detects the water temperature Tw of cooling water for the engine 2 or the oil temperature To of lubricating oil; the starting torque calculating section 15 calculates the engine starting torque required to start the engine 2 on the basis of the water temperature Tw or oil temperature To of the engine 2 detected by the engine temperature detecting section 19; and the EV range setting section 17 calculates the electric motor output range from the battery output of the battery 30, the engine starting torque and the electric motor maximal torque of the electric motor 3, and sets up, as the EV range, the range in which the calculated electric motor output range is set to the maximal torque. By configuring it in this manner, unlike the case of the first embodiment, the EV range is set up without regard for the electric motor torque or electric motor output of the electric motor 3. However, it is possible to set up a sufficiently wide EV range although some connection shock may occur when the engine 2 is connected to the electric motor 3.

In this regard, the modified example of the power output apparatus according to the first embodiment can be adopted even in the power output apparatus according to the second embodiment as a modified example unless they conflict the configuration and the functions of the power output apparatus according to the second embodiment. In this case, it is possible to achieve the similar effects to those in the case of applying it to the first embodiment.

Here, a modified example of the embodiment described above according to the present invention will be described. The power output apparatus according to the present invention can be applied to a so-called plug-in hybrid vehicle in addition to the hybrid vehicle in which the battery 30 is charged by causing the electric motor 3 to regenerate at driving of the vehicle 1. Hereinafter, a method of setting up an EV range in the case where the power output apparatus according to the present invention is applied to a plug-in hybrid vehicle will be described. In this regard, since a hardware configuration of the plug-in hybrid vehicle is substantially similar to that of the hybrid vehicle according to the first and second embodiments, its illustration is omitted, and added and modified points will be described using the reference numerals of the respective constituent elements in FIG. 1 and FIG. 5.

In the plug-in hybrid vehicle, in order to enlarge an EV driving range, the capacity (battery capacity) of the battery 30 is often increased compared with a normal hybrid vehicle. This is intended to improve gasoline mileage (fuel economy) by enlarging an opportunity of the EV driving in the plug-in hybrid vehicle. In this way, in the case where a capacity of the battery 30 is large, it is possible to ensure starting torque of the engine 2 sufficiently. For this reason, by setting up the amount of pressing of the accelerator pedal (the degree of opening of the accelerator pedal) and a threshold value of pressing time to higher compared with a normal hybrid vehicle, it is possible to enlarge the EV range (EV possible range). In this case, since the electric motor torque can be enlarged with respect to the number of revolutions of the electric motor 3, it is possible to retard start timing of the engine 2. Thus, since the EV driving opportunity is enlarged, it possible to improve fuel economy of the vehicle 1 further.

Here, in the plug-in hybrid vehicle, in order to directly charge the battery 30, a battery charger (not shown in the drawings) is provided. The battery charger allows the battery 30 to be charged by inserting a plug for charge (not shown in the drawings) into a plug for a household wall outlet (that is, external power supply).

Figure 14:
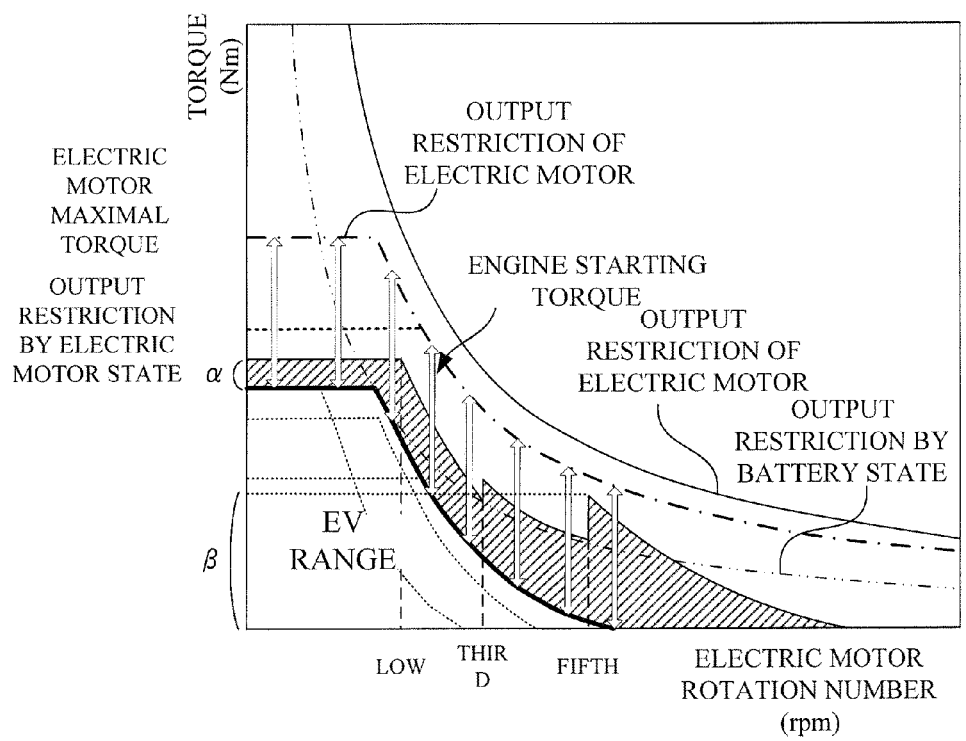
FIG. 14 is a torque/rotation number characteristics map of the electric motor for explaining the method of setting up the EV range in a plug-in hybrid vehicle according to a modified example of the present invention.

Next, a method of setting up an EV range by means of the EV range setting section 17 will be described using a torque/rotation number characteristics map for the electric motor 3 of FIG. 14. FIG. 14 is a torque/rotation number characteristics map of the electric motor 3 for explaining the method of setting up the EV range (EV driving range) in a plug-in hybrid vehicle. As well as the embodiment described above as explained using FIG. 6A and FIG. 6B, in the present example, the EV range setting section 17 first sets up, as an EV range, a range obtained by subtracting torque restriction due to the state of the electric motor 3 and engine starting torque from output restriction of the electric motor 3.

The EV range setting section 17 then sets up, as the EV range of the plug-in hybrid vehicle, a range (range shown by a solid line and range shown by oblique lines in FIG. 14) in which this EV range is enlarged to a range (shaded area in FIG. 14) taking the drivability permissible amount (threshold value that is determined to be comfortable for the driver of the vehicle 1) into consideration.

Here, acceleration (G) of shift shock at shift change of the transmission 4 may be used as the drivability permissible amount, for example. At this time, drivability permissible amount, for example, a permissible amount N in the case of connecting a start clutch (one-way clutch) between the input shaft of the engine 1 and the transmission 4 can be acquired by a calculation expression below using vehicle body weight of the vehicle 1, a radius of wheel of the drive wheel and a gear ratio in each gear when a dropping amount (shift shock amount) from an EV driving state to drive of the engine 2 is 0.01 G.

$$N=(\text{vehicle body weight}) \times (\text{radius of wheel})/(\text{gear ratio})$$

As one example, if the vehicle body weight is 1,300 kgf, the radius of wheel is 0.3 m, and gear ratios of a low gear and a fifth gear are respectively 15 and 2.5, a permissible amount N1 in the low gear and a permissible amount N5 in the fifth gear are as follows.

$$N1=1{,}300 \times 0.3/15=26 \text{ (Nm)}$$

$$N5=1{,}300 \times 0.3/2.5=156 \text{ (Nm)}$$

Therefore, when the gear of the transmission 4 is the low gear, as a shock permissible value, 26 Nm (corresponding to "α" in FIG. 14) may be subtracted from the engine starting torque shown in FIG. 14. Namely, the EV range may be enlarged by 26 Nm. Further, similarly, when the gear is the fifth gear, as a drawing permissible value of the engine 1, 156 Nm (corresponding to "β" in FIG. 14) may be subtracted from the engine starting torque. Namely, the EV range may be enlarged by 156 Nm. In this way, by permitting the shift shock of the transmission 4 up to a predetermined level in the plug-in hybrid vehicle, it is possible to enlarge the EV range further. Therefore, since an EV driving opportunity is increased, it is possible to improve fuel economy of the vehicle 1.

In this regard, as is obvious from the calculation expressions described above, the shift shock can be permitted further in the fifth gear. This is because the gear ratio is lower compared with the low gear and variation at shift change is thus amplified hardly. For that reason, even though the shift shock is 0.01 G worth, it is possible to enlarge the EV range adequately. Further, at driving of the vehicle 1 with the fifth gear, that is, at high speed driving to an extent, since the electric motor 3 rotates at high speed, inertial force is applied to the engine 2. For that reason, it can be expected that the shock regarding start of the engine 2 is offset by the inertial force.

As described above, although the embodiments of the power output apparatus according to the present invention have been explained in detail on the basis of the appending drawings, the present invention is not limited to these configurations. Various modifications can be made in a scope of the technical idea described in the following claims, the specification described above and the appending drawings without departing from the spirit and scope of the present invention. In this regard, even any shape, structure or function that is not described directly in the specification and the drawings falls within the technical idea of the present invention so long as the function and the effect of the present invention are achieved. Namely, each component constituting the electronic control unit 10, the engine 2, the electric motor 3 and the transmission 4 that constitute the power output apparatus can be replaced with any arbitrary component that can achieve the similar function to the corresponding component of the power output apparatus. Further, arbitrary components may be added thereto.

In the embodiments described above, although the transmission 4 has been explained as a dry-type twin clutch transmission DCT, the present invention is not limited to such a transmission. The transmission 4 may be a wet-type transmission provided with a hydraulic control apparatus, for example.

What is claimed is:

1. A power output apparatus for a vehicle, the vehicle comprising an engine, an electric motor, an electric motor control section for controlling the electric motor, a battery, a disconnecting and connecting section for disconnecting and connecting the engine from and to the electric motor, and a transmission, the power output apparatus being arranged to start the engine by the electric motor, the power output apparatus comprising:
    a battery state detecting section for detecting at least one of a state and a storage amount of the battery;
    a battery output calculating section for calculating a battery output on the basis of at least one of the detected state and the detected storage amount of the battery;
    an electric motor state detecting section for detecting a state of the electric motor;
    an electric motor torque/output calculating section for calculating at least one of an electric motor torque, an electric motor output outputted from the electric motor, and a maximal torque of the electric motor on the basis of the detected state of the electric motor;
    an engine state detecting section for detecting a state of the engine;
    a starting torque calculating section for calculating an engine starting torque required to start the engine on the basis of the detected state of the engine; and
    an EV range setting section for setting up an EV range on the basis of the battery output, the at least one of the electric motor torque, the electric motor output, and the engine starting torque required to start the engine, the engine being disconnected from the electric motor and the vehicle being able to be driven with only the electric motor in the EV range,
    wherein the EV range setting section compares the battery output of the battery with the electric motor torque or the electric motor output of the electric motor to select any lower one therefrom, and sets up, as the EV range, a range obtained by adding a range in which the engine starting torque is subtracted from the selected torque or output into a range in which the engine starting torque is subtracted from the electric motor maximal torque.

2. A power output apparatus for a vehicle, the vehicle comprising an engine, an electric motor, an electric motor control section for controlling the electric motor, a battery, a disconnecting and connecting section for disconnecting and connecting the engine from and to the electric motor, and a transmission, the power output apparatus being arranged to start the engine by the electric motor, the power output apparatus comprising:
    a battery state detecting section for detecting at least one of a state and a storage amount of the battery;
    a battery output calculating section for calculating a battery output outputted by the battery on the basis of at least one of the detected state and the detected storage amount of the battery;
    an electric motor state detecting section for detecting at least torque and the number of revolutions of the electric motor;
    an electric motor torque/output calculating section for calculating an output outputted from the electric motor and a maximal torque of the electric motor on the basis of the torque and the number of revolutions of the electric motor;
    an engine state detecting section for detecting a state of the engine;
    a starting torque calculating section for calculating an engine starting torque required to start the engine on the basis of the detected state of the engine; and
    an EV range setting section for setting up an EV range on the basis of the battery output, the electric motor torque, and the engine starting torque required to start the engine, the engine being disconnected from the electric motor and the vehicle being able to drive with only the electric motor in the EV range,
    wherein the EV range setting section compares the battery output of the battery with the electric motor output of the electric motor to select any lower one therefrom, and sets up, as the EV range, a range obtained by adding a range in which the engine starting torque is subtracted from the selected output into a range in which the engine starting torque is subtracted from the electric motor maximal torque.

3. The power output apparatus as claimed in claim 1 or 2, further comprising:
    a vehicle speed detecting section for detecting vehicle speed of the vehicle,
    wherein the starting torque calculating section calculates, as the engine starting torque, a value obtained by subtracting a lower limit from the calculated engine starting torque in accordance with the detected vehicle speed.

4. The power output apparatus as claimed in claim 1 or 2, wherein the battery state detecting section detects at least one of a voltage, an electric current, an electric current integrated value, a temperature, a battery inner pressure and a battery internal concentration of the battery.

5. The power output apparatus as claimed in claim 1 or 2, wherein the electric motor state detecting section directly detects an electric motor temperature by an electric motor temperature sensor, or detects a conducted electric current, torque and the number of revolutions of the electric motor to estimate the electric motor temperature.

6. The power output apparatus as claimed in claim 1 or 2, wherein the engine state detecting section detects one of a water temperature of cooling water for the engine and an oil temperature of lubricating oil for the engine, and a position of a piston of the engine.

7. A power output apparatus for a vehicle, the vehicle comprising an engine, an electric motor, an electric motor control section for controlling the electric motor, a battery, a disconnecting and connecting section for disconnecting and connecting the engine from and to the electric motor, and a transmission, the power output apparatus being arranged to start the engine by the electric motor, the power output apparatus comprising:
    a remaining capacity detecting section for detecting a remaining capacity of the battery;
    a battery temperature detecting section for detecting a temperature of the battery;
    a battery output calculating section for calculating a battery output on the basis of the detected remaining capacity of the battery and the detected temperature;
    an electric motor state detecting section for detecting a state of the electric motor;
    an electric motor torque calculating section for calculating an electric motor maximal torque on the basis of the detected state of the electric motor;
    an engine temperature detecting section for detecting a temperature of the engine;

a starting torque calculating section for calculating an engine starting torque required to start the engine on the basis of the detected temperature of the engine; and an EV range setting section for setting up an EV range on the basis of the battery output, the electric motor maximal torque, and the engine starting torque required to start the engine, the engine being disconnected from the electric motor and the vehicle being able to drive with only the electric motor in the EV range, wherein the EV range setting section calculates an electric motor output range based on the battery output of the battery, the engine starting torque and the electric motor maximal torque of the electric motor, and sets up, as the EV range, a range in which the calculated electric motor output range is set to maximal torque.

8. A power output apparatus for a vehicle, the vehicle comprising an engine, an electric motor, an electric motor control section for controlling the electric motor, a battery, a disconnecting and connecting section for disconnecting and connecting the engine from and to the electric motor, and a transmission, the power output apparatus being arranged to start the engine by the electric motor, the power output apparatus comprising:

a remaining capacity detecting section for detecting a remaining capacity of the battery;

a battery temperature detecting section for detecting a temperature of the battery;

a battery output calculating section for calculating a battery output on the basis of the detected remaining capacity of the battery detected and the detected temperature of the battery;

an electric motor temperature detecting section for detecting a temperature of the electric motor;

an electric motor torque calculating section for calculating an electric motor maximal torque outputted in response to a torque command value outputted from the electric motor control section on the basis of the detected temperature of the electric motor;

an engine temperature detecting section for detecting a temperature of the engine;

a starting torque calculating section for calculating an engine starting torque required to start the engine on the basis of the detected temperature of the engine; and an EV range setting section for setting up an EV range on the basis of the battery output, the electric motor maximal torque, and the engine starting torque required to start the engine, the engine being disconnected from the electric motor and the vehicle being able to drive with only the electric motor in the EV range, wherein the electric motor torque calculating section calculates the electric motor torque on the basis of the detected temperature of the electric motor, and the EV range setting section sets up, as the EV range, a range in which the electric motor torque is set to a maximal torque so as to fit in a predetermined range from the battery output.

9. The power output apparatus as claimed in any one of claim 1, 2, 7 and 8, wherein the engine state detecting section or the engine temperature detecting section detects temperature of the engine when the engine is disconnected from the electric motor, and the EV range setting section sets up the EV range on the basis of the temperature of the engine when the engine disconnects from the electric motor.

10. The power output apparatus as claimed in any one of claim 1, 2, 7 and 8, further comprising:

a disconnecting and connecting control section for controlling the disconnecting and connecting section to disconnect the engine from the electric motor or connect the electric motor to the engine in accordance with a driving state of the vehicle, wherein the disconnecting and connecting control section is configured not to disconnect the engine based on the detected remaining capacity of the battery.

11. The power output apparatus as claimed in any one of claim 1, 2, 7 and 8, wherein, when the electric motor is arranged to be adjacent to the engine, the electric motor state detecting section or the electric motor temperature detecting section sets an oil temperature of lubricating oil detected by the engine state detecting section or a water temperature of the cooling water detected by the engine temperature detecting section as the temperature of the electric motor.

12. The power output apparatus as claimed in any one of claim 1, 2, 7 and 8, further comprising:

a disconnecting and connecting control section for controlling the disconnecting and connecting section to disconnect the engine from the electric motor in accordance with a driving state of the vehicle, wherein, in the case where driving force required of the electric motor exceeds the EV range while the vehicle is driven with only the electric motor, the disconnecting and connecting control section causes the disconnecting and connecting section to:

connect the electric motor to the engine, disconnect after push starting of the engine by ensuring the engine starting torque required for start of the engine from the electric motor, and connect the electric motor to the engine again at the time when the number of revolutions of the engine becomes equivalent to the number of revolutions of an input shaft of the electric motor during an EV driving.

13. The power output apparatus as claimed in claim 12, wherein the EV range setting section increases the EV range by the engine starting torque when the electric motor is disconnected from the engine after the disconnecting and connecting section connects the engine to the electric motor in order to start the engine.

14. The power output apparatus as claimed in any one of claim 1, 2, 7 and 8, wherein the vehicle further includes a navigation system for navigating driving of a driver of the vehicle, wherein the EV range setting section determines whether a regeneration from the electric motor is carried out on the basis of a navigation state in the navigation system, and wherein the EV range setting section causes the EV range to increase upon determining that a regeneration from the electric motor is carried out.

15. The power output apparatus as claimed in any one of claim 1, 2, 7 and 8, wherein, upon determining that a driving force required of the electric motor exceeds the EV range to shift from an EV driving to a collaboration driving between the engine and the electric motor, the EV range setting section moves a boundary of the EV range in such a direction not to shift from the collaboration driving to the EV driving for a certain period of time.

16. The power output apparatus as claimed in any one of claim 1, 2, 7 and 8, wherein, after shifting from a collaboration driving between the engine and the electric motor to an EV driving, the EV range setting section moves a boundary of the EV range in a direction to maintain the EV driving for a certain period of time.

17. The power output apparatus as claimed in any one of claim 1, 2, 7 and 8, wherein the vehicle is a plug-in hybrid vehicle having the battery capable of being charged from an external power supply, and wherein the EV range setting section expands the EV range in accordance with a capacity of the battery.

18. The power output apparatus as claimed in claim 17, wherein the transmission has a plurality of gears each having a predetermined gear ratio, and wherein the EV range setting section sets up a region to expands the EV range on the basis of a vehicle body weight of the vehicle, a radius of a drive wheel of the vehicle, the respective gear ratios of the plurality of gears, and a shift shock amount permitted at shift of gears.

* * * * *